(12) United States Patent
Sheri et al.

(10) Patent No.: US 11,254,784 B2
(45) Date of Patent: Feb. 22, 2022

(54) METHOD FOR DEBLOCKING A BLOCKED ISOCYANATE AND METHOD OF MAKING A POLYURETHANE

(71) Applicants: THE UNIVERSITY OF MASSACHUSETTS, Boston, MA (US); BASF SE, Ludwigshafen am Rhein (DE)

(72) Inventors: Madhu Sheri, Sunderland, MA (US); Umesh Choudhary, Worcester, MA (US); Todd Emrick, South Deerfield, MA (US); Sunitha Grandhee, Novi, MI (US)

(73) Assignees: THE UNIVERSITY OF MASSACHUSETTS, Boston, MA (US); BASF SE, Ludwigshafen am Rhein (DE)

( * ) Notice: Subject to any disclaimer, the term of this patent is extended or adjusted under 35 U.S.C. 154(b) by 82 days.

(21) Appl. No.: 16/637,005

(22) PCT Filed: Aug. 31, 2018

(86) PCT No.: PCT/US2018/049018
§ 371 (c)(1),
(2) Date: Feb. 6, 2020

(87) PCT Pub. No.: WO2019/046679
PCT Pub. Date: Mar. 7, 2019

(65) Prior Publication Data
US 2020/0239623 A1  Jul. 30, 2020

Related U.S. Application Data

(60) Provisional application No. 62/552,687, filed on Aug. 31, 2017.

(51) Int. Cl.
*C08G 18/28* (2006.01)
*C08G 18/80* (2006.01)
(Continued)

(52) U.S. Cl.
CPC ..... *C08G 18/8029* (2013.01); *C08G 18/2825* (2013.01); *C08G 18/73* (2013.01);
(Continued)

(58) Field of Classification Search
CPC .......... C08G 18/8029; C08G 18/2825; C08G 18/73; C08G 18/7621; C08G 18/7678
See application file for complete search history.

(56) References Cited

U.S. PATENT DOCUMENTS

| 4,518,522 A | 5/1985 | Markusch et al. |
| 4,801,675 A * | 1/1989 | Pedain ................. C08G 18/664 528/73 |
| 6,482,536 B1 | 11/2002 | Tanaka et al. |

(Continued)

FOREIGN PATENT DOCUMENTS

EP   303150 A  *  2/1989  ......... C07C 119/042

OTHER PUBLICATIONS

ARCOL® LHT-240, Technical Datasheet | Supplied by Covestro, Edited Oct. 24, 2019.*

(Continued)

*Primary Examiner* — Michael L Leonard
(74) *Attorney, Agent, or Firm* — Cantor Colburn LLP

(57) ABSTRACT

A method for deblocking a blocked isocyanate is described herein. The method includes contacting a blocked isocyanate and a halide ion source under conditions effective to provide a deblocked isocyanate. A method of making a polyurethane is also disclosed. The method of making a polyurethane includes combining a blocked isocyanate, a (Continued)

polyol, and a halide ion source in the presence of solvent and under conditions effective to provide the polyurethane.

20 Claims, 9 Drawing Sheets

(51) Int. Cl.
*C08G 18/73* (2006.01)
*C08G 18/76* (2006.01)
*C09D 175/04* (2006.01)

(52) U.S. Cl.
CPC ..... *C08G 18/7621* (2013.01); *C08G 18/7678* (2013.01); *C09D 175/04* (2013.01)

(56) References Cited

U.S. PATENT DOCUMENTS

| | | |
|---|---|---|
| 2005/0096450 A1 | 5/2005 | Spyrou et al. |
| 2007/0003745 A1 | 1/2007 | Edstrom et al. |
| 2008/0319111 A1* | 12/2008 | Deyda .................. C08G 18/225 524/403 |
| 2011/0155374 A1 | 6/2011 | Mackay |
| 2018/0072929 A1* | 3/2018 | Hu .......................... C09J 175/16 |

OTHER PUBLICATIONS

International Search Report for the corresponding PCT/US2018/049018; Date of Filing: Aug. 31, 2018; dated Nov. 9, 2018; 4 pages.
Written Opinion for the corresponding PCT/US2018/049018; Date of Filing: Aug. 31, 2018; dated Nov. 9, 2018; 15 pages.

* cited by examiner

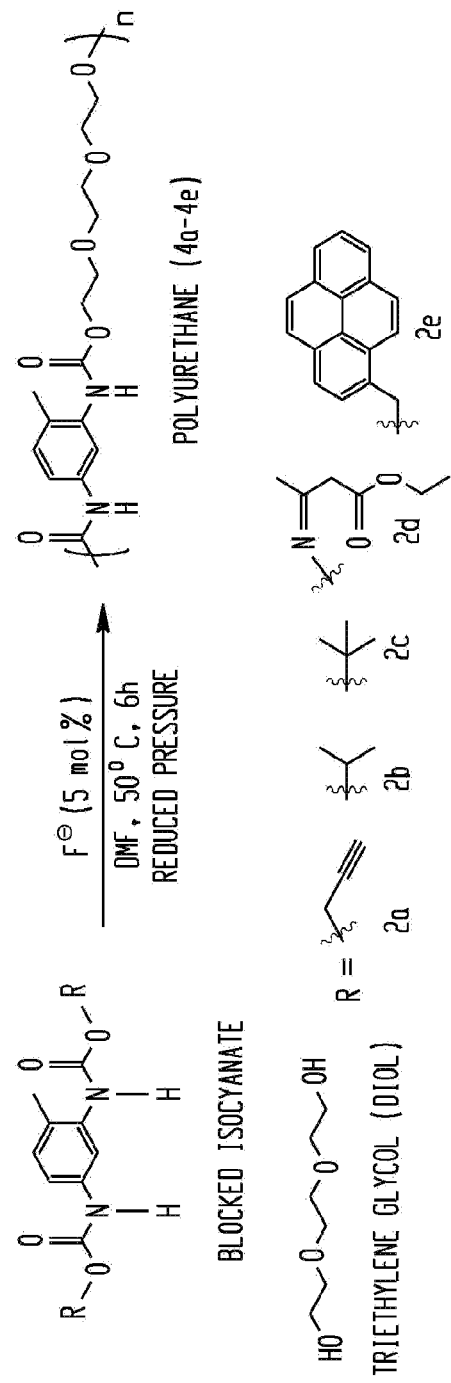
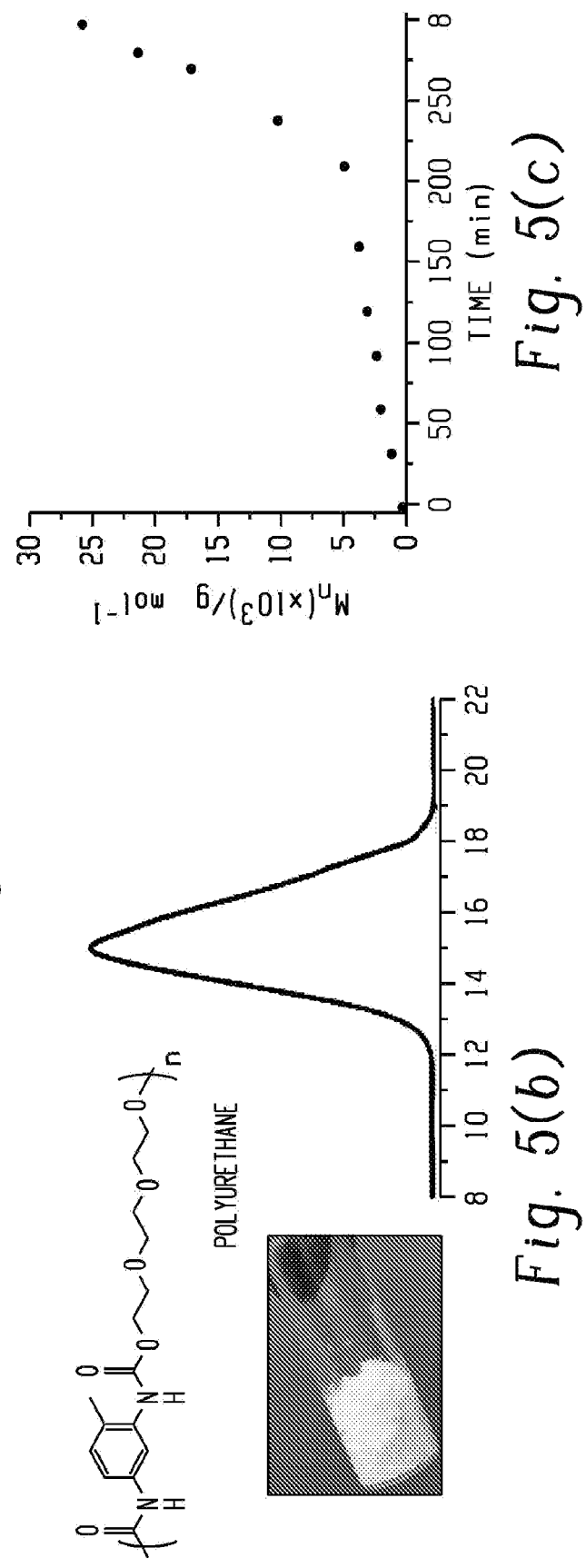
Fig. 5(a)
Fig. 5(b)
Fig. 5(c)

METHOD FOR DEBLOCKING A BLOCKED ISOCYANATE AND METHOD OF MAKING A POLYURETHANE

CROSS-REFERENCE TO RELATED APPLICATIONS

This application is a National Stage application of PCT/US2018/049018, filed Aug. 31, 2018, which claims the benefit of U.S. Provisional Application No. 62/552,687, filed Aug. 31, 2017, both of which are incorporated by reference herein in their entirety.

BACKGROUND

Since their discovery by Bayer and co-workers, polyurethane (PU)-based materials have escalated to a position of major societal importance. See, e.g., Bayer, O.; Siefhen, W.; Rinke, H.; Orther, L.; Schild, H. *DE Pat,* 728981C, 1937; Bayer, O. *Angew. Chem.* 1947, 59, 257. The PU market continues rapid growth, owing to the superior properties of these polymers in numerous applications including as sealants, adhesives, foams, and coatings. See, e.g., Wicks, D. A.; Wicks, Z. W. *Prog. Org. Coat.* 2000, 41, 1; Lavrenova, A.; Balkenende, D. W. R.; Sagara, Y.; Schrett, S.; Simon, Y. C.; Weder, C. *J. Am. Chem. Soc.* 2017, 139, 4302; Sijbesma, R. P.; Beijer, F. H.; Brunsveld, L.; Folmer, B. J. B.; Hirschberg, J. H. K. K.; Lange, R. F. M.; Lowe, J. K. L.; Meijer, E. W. *Science,* 1997, 278, 1601; Dusek, K.; Duskova-Smrckova, M. *Prog. Polym. Sci.* 2000, 25, 1215; Potter, T. A.; Schmelzer, H. G.; Baker, R. D. *Prog. Org. Coat.* 1984, 12, 321; Somani, K. P.; Kansara, S. S.; Patel, N. K.; Rakshit, A. K. *Int. J. Adhes. Adhes.* 2003, 23, 269; Du, H.; Zhao, Y.; Li, Q.; Wang, J.; Kang, M.; Wang, X.; Xiang, H. *J. Appl. Polym. Sci.* 2008, 110, 1396; Elwell, M. J.; Ryan, A. J.; Gruenbauer, H. J. M.; Van Lieshout, H. C. *Macromolecules,* 1996, 29, 2960; Zhang, L.; Jeon, H. K.; Malsam, J.; Herrington, R.; Macosko, C. W. *Polymer,* 2007, 48, 6656; Chattopadhyay, D. K.; Raju, K. V. S. N. *Prog. Polym. Sci.* 2007, 32, 352; Melchiors, M.; Sonntag, M.; Kobusch, C.; Jürgens, E. *Prog. Org. Coat.* 2000, 40, 99. PU properties are tailored by structural variation of the monomers, typically consisting of diisocyanates, diols, and polyols. See, e.g., Wicks, D. A.; Wicks, Z. W. *Prog. Org. Coat.* 1999, 36, 148. (15) Folmer, B. J. B.; Sijbesma, R. P.; Versteegen, R. M.; van der Rijit, J. A. J.; Meijer, *Adv. Mater.* 2000, 12, 874; Balkenende, D. W. R.; Monnier, C. A.; Fiore, G. L.; Weder, C. *Nat. Commun.* 2016, 7, 10995; Delebecq, E.; Pascault, J. -P.; Boutevin, B.; Ganachaud, F. *Chem. Rev.* 2013, 113, 80; L. Rand, R. Dolinski, *J. Org. Chem.* 1965, 30, 48.

However, even conventional polyurethane chemistry carries significant challenges, including moisture sensitivity and toxicity of the isocyanate monomers. "Blocked" isocyanates, obtained by reacting isocyanates with alcohols, are more stable and less toxic, and serve as isocyanate surrogates in polyurethane synthesis. See, e.g., Krol, P. *Prog. Mater. Sci.* 2007, 52, 915; Rolph, M. S.; Markowska, A. L. J.; Warriner, C. N.; O'Reilly, R. K. *Polym. Chem.* 2016, 7, 7351; Maisonneuve, L.; Lamarzelle, O.; Rix, E.; Grau, E.; Cramail, H. *Chem. Rev.* 2015, 115, 12407; Wicks, D. A.; Wicks, Z. W. *Prog. Org. Coat.* 2001, 43, 131; Sardon, H.; Engler, A. C.; Chan, J. M. W.; Garcia, J. M.; Coady, D. J.; Pascul, A.; Mecerreyes, D.; Jones, G. O.; Rice, J. E.; Horn, H. W.; Hedrick, J. L. *J. Am. Chem. Soc.* 2013, 135, 16235. At elevated temperature and in the presence of a catalyst, loss of the blocking group regenerates the isocyanate, which polymerizes with diols or polyols. This chemistry presents its own complexities by requiring high deblocking temperatures and resulting in variable success depending on the selected isocyanate, solvent, catalyst, and blocking moiety. Solvents and co-reactants induce disparities in deblocking temperatures, with higher temperatures promoting isocyanurate formation and degradation. See, e.g., Delebecq, E.; Pascault, J.-P.; Boutevin, B.; Ganachaud, F. *Chem. Rev.* 2013, 113, 80; Semsarzadeh, M. A.; Navarchian, A. H. *J. Appl. Polym. Sci.* 2003, 90, 963.

As such, efficient new methods for isocyanate deblocking are needed on both a small and large scale. It would be particularly desirable to provide a method for isocyanate deblocking wherein deblocking occurs at lower temperatures. Such a method would be advantageous in terms of energy usage, as well as for applications in coatings for temperature-sensitive substrates (e.g., plastics and wood).

BRIEF SUMMARY

One embodiment is a method for deblocking a blocked isocyanate, the method comprising contacting a blocked isocyanate, and a halide ion source, under conditions effective to provide a deblocked isocyanate.

Another embodiment is a method of making a polyurethane, the method comprising combining a blocked isocyanate comprising at least two blocked isocyanate groups; a polyol; and a halide ion source; in the presence of a solvent and under conditions effective to provide the polyurethane.

These and other embodiments are described in detail below.

BRIEF DESCRIPTION OF THE DRAWINGS

The following Figures represent exemplary embodiments.

FIG. 5 is (a) a chemical scheme showing the preparation of polyurethanes by deblocking and polymerization and shows (b) a representative gel permeation chromatogram of the resulting polyurethane and (c) shows the molecular increase over time determined using GPC.

DETAILED DESCRIPTION

Figure 1A:
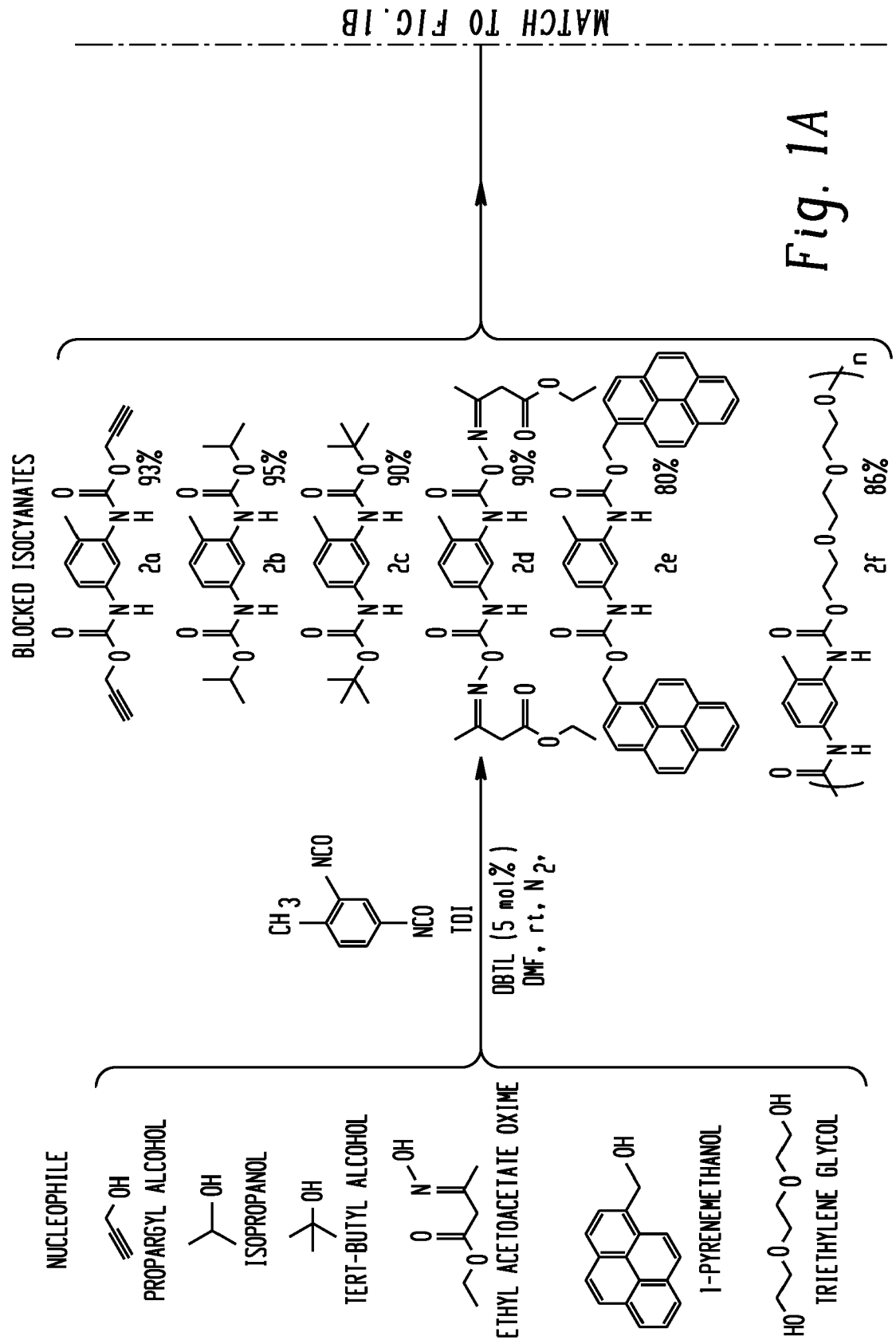
FIG. 1 is a chemical scheme showing the synthetic strategy for isocyanate blocking (urethane formation) and halide-catalyzed deblocking.

The present inventors have discovered a halide-catalyzed deblocking of "blocked" isocyanates, whereby the deblocking regenerates the original isocyanate functionality. Among the halides evaluated, organic and inorganic sources of fluoride ion proved most effective for deblocking urethanes and for converting polyurethanes to small molecule starting materials. Distinct from conventional deblocking chemistry involving organotin compounds and high temperatures, this method is metal-free and operates efficiently at or near ambient temperature. The conditions described herein proved applicable to urethanes containing a variety of blocking groups, as well as a one pot deblocking and polymerization with α,ω-diols present in solution. Overall, this deblocking/polymerization strategy offers a convenient, low temperature, efficient solution that addresses the above-described technical limitations of previous methods.

Accordingly, one aspect of the present disclosure is a method for deblocking a blocked isocyanate. The method comprises contacting a blocked isocyanate and a fluoride ion source under conditions effective to provide the corresponding deblocked isocyanate. As used herein, the term "deblocked isocyanate" refers to an isocyanate-containing compound in its native form. The deblocked isocyanate can also be referred to as a native isocyanate.

As used herein, the term "blocked isocyanate" is used in its ordinary meaning to those skilled in the art, who understand it to mean a compound containing at least one blocked isocyanate group in its structure, obtained by reaction of an isocyanate with an isocyanate blocking agent.

The blocked isocyanate is derived from an isocyanate-containing compound comprising at least one isocyanate group. In some embodiments, the blocked isocyanate is derived from an isocyanate compound comprising at least two isocyanate groups per molecule. In some embodiments, the blocked isocyanate is derived from a monoisocyanate (i.e., an isocyanate compound having one isocyanate group per molecule), a diisocyanate (i.e., an isocyanate compound having two isocyanate groups per molecule), a triisocyanate (i.e., an isocyanate compound having three isocyanate groups per molecule), or a combination comprising at least one of the foregoing.

Suitable organic isocyanates from which the blocked isocyanate can be derived can include those having the general formula Q(NCO), wherein i is an integer of one or more and Q is an organic group having the valence of i. In some embodiments, i is one. In some embodiments, i has an average value of greater than or equal to 2. Q can be a substituted or unsubstituted hydrocarbon group that may or may not contain aromatic functionality, or a group having the formula $Q^1$-Z-$Q^1$ wherein $Q^1$ is a $C_{1-36}$ alkylene or $C_{6-36}$ arylene group and Z is —O—, —O-$Q^1$-O—, —CO—, —S—, —SO—, —$SO_2$—, $C_{1-24}$ alkylene or $C_{6-24}$ arylene.

The blocked isocyanate can be derived from a monoisocyanate (i.e., a compound comprising one isocyanate group per molecule. Thus, in some embodiments, the monoisocyanate can have the general formula Q(NCO), wherein i is one and Q is a $C_{3-30}$ alkyl group (e.g., methyl, ethyl, propyl, n-butyl, iso-butyl, and sec-butyl groups, and the like), a $C_{3-20}$ cycloalkyl group (e.g., cyclopentyl or cyclohexyl groups, and the like), or a $C_{6-30}$ aromatic group (e.g., a phenyl group, a chlorophenyl group, a o-, m-, or p-tolyl group, and the like).

The blocked isocyanate can be of formula (I)

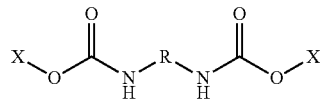

(I)

wherein R is independently at each occurrence a substituted or unsubstituted $C_{1-18}$ alkylene group or a substituted or unsubstituted $C_{6-20}$ arylene group and X is independently at each occurrence a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group.

In some embodiments, the blocked isocyanate can be derived from an isocyanate-containing compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof. Preferably, the blocked isocyanate can be derived from an isocyanate-containing compound comprising 2,4-toluene diisocyanate, 2,6-toluene diisocyanate, 4,4'-diphenylmethane diisocyanate, or a combination thereof.

As described above, the blocked isocyanate is obtained by reaction of an isocyanate with an isocyanate blocking agent. Any suitable isocyanate blocking agent can be used to provide the blocked isocyanates for the method of the present disclosure. Examples of isocyanate blocking agents include those commonly employed in the art, such as various phenolic compounds, for example, phenol, thiophenol, chlorophenol, methyl thiophenol, ethyl phenol, t-butylphenol, ethyl thiophenol, nitrophenol, cresol, xylenol, resorcinol, hydroxy benzoic acid or an ester thereof, or 2,5-di-tert-butyl-4-hydroxytoluene; polycyclic aromatic hydrocarbons, for example pyrene methanol; alcohols such as ethanol, methanol, propanol, isopropanol, butanol, tert-butanol, tert-pentanol, tert-butanethiol, tert-hexanol, propargyl alcohol, 2-chloroethanol, omega-hydroperfluoroalcohols, 1,3-dichloro-2-propanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, ω-hydroperfluoro-alcohol, or acetocyanohydrin; aromatic amines such as diphenylamine, diphenyl naphthyl amine or xylidine; imides such as succinic acid imide or phthalic acid imide; active methylene compounds such as acetoacetic acid esters, acetyl acetone or malonic acid diesters; mercaptans such as 2-mercaptobenzothiazole or tert-dodecyl mercaptan; pyrazoles such as 3,5-dimethylpyrazole, lactams such as epsilon-caprolactam, delta-valerolactam, gamma-butyrolactam or beta-propyllactam; imines such as ethylene imine; urea compounds such as urea, thiourea or diethylene urea; oximes such as acetoxime, methylethyl-ketone oxime, or cyclohexanone oxime; diaryl compounds such as carbazole, phenyl naphthyl amine or N-phenyl xylidine; bisulfates; and borates. Mixtures comprising at least one of the foregoing blocking agents can also be employed in providing the blocked isocyanates of the present disclosure. Of these blocking agents, sec-propanol, tert-butanol, propargyl alcohol, pyrene methanol, and combinations thereof can be preferred. Thus, in some embodiments, X in formula (I) can independently at each occurrence be a sec-propyl group, a tert-butyl group, a propargyl group, or a methyl pyrene group.

In some embodiments, the blocked isocyanate can refer to an addition product obtained by the reaction of an excess amount of the above-mentioned isocyanates with lower molecular weight multifunctional (e.g., difunctional) compounds such as ethylene glycol, propylene glycol, butylene glycol, trimethylol propane, hexanetriol, glycerol, diethylene glycol, triethylene glycol, sorbitol, pentaerythritol, castor oil, ethylenediamine, hexamethylenediamine, monoethanolamine, diethanolamine, triethanolamine, polyether based polyols, polyester based polyols, aromatic polyols, or a combination thereof. Thus, in some embodiments, the blocked isocyanate can be according to formula (II)

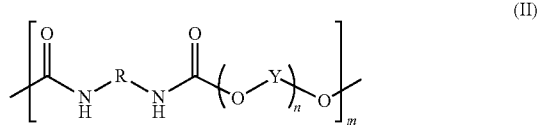
(II)

wherein R is as described above, and Y is independently at each occurrence a substituted or unsubstituted $C_{1-18}$ alkylene group or a substituted or unsubstituted $C_{6-20}$ arylene group, n is 1 to 100, and m is 1 to 100. In some embodiment, m is greater than 1 to 100, for example 5 to 100, or 10 to 100. In a specific embodiment, Y in formula (II) is an ethylene group (i.e., a $C_2$ alkylene group) and n is 3.

The polymeric blocked isocyanate of formula (II) can optionally further include at least two blocked isocyanate end groups of formula (III)

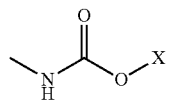
(III)

wherein X is a group derived from an isocyanate blocking agent, and can thus be as described above. The polymeric blocked isocyanate can also be referred to as a blocked isocyanate prepolymer, which can be linear or branched. When the blocked isocyanate prepolymer is a branched prepolymer, it will include greater than two blocked isocyanate end groups of formula (III).

The halide ion source can be a fluoride ion source, a chloride ion source, a bromide ion source, an iodide ion source, or a combination thereof. Exemplary halide ion sources can include a tetra($C_{1-6}$alkyl)ammonium halide, a potassium halide, a sodium halide, a cesium halide, a lithium halide, a lithium tetrahaloborate, a hydrogen halide, a hydrogen halide pyridine, or a combination thereof. Preferably, the halide ion source comprises a fluoride ion source, for example a tetra($C_{1-6}$alkyl)ammonium fluoride, potassium fluoride, sodium fluoride, cesium fluoride, lithium fluoride, lithium tetrafluoroborate, hydrogen fluoride, hydrogen fluoride pyridine, or a combination thereof. In a specific embodiment, the halide ion source comprises a fluoride ion source comprising tetra(n-butyl)ammonium fluoride, cesium fluoride, or a combination thereof.

The halide ion source can be present in an amount effective to deblock the blocked isocyanate. The amount of the halide ion source can be dependent upon such factors as the particular blocked isocyanate used, and the temperature and time employed in the deblocking reaction. For example, the halide ion source can be present in an amount of 1 to 20 mole percent, or 1 to 15 mole percent, or 1 to 10 mole percent, or 1 to 8 mole percent, or 3 to 7 mole percent, based on the total moles of the blocked isocyanate.

Contacting of the blocked isocyanate and the halide ion source is under conditions effective to provide the deblocked isocyanate. For example, the contacting of the blocked isocyanate and the halide ion source can be in the presence of a solvent. Generally, any solvent capable of solubilizing the blocked isocyanate and the halide ion source can be used provided that the solvent is not reactive towards the halide ion source or the deblocked isocyanate product (e.g., the solvent can be hydroxyl-free). In some embodiments the solvent can comprise a nonpolar solvent such as dioxane. In a preferred embodiment, the solvent is a polar aprotic solvent. Exemplary polar aprotic solvents can include dimethylformamide, dimethylsulfoxide, N-methyl-2-pyrrolidone, tetrahydrofuran, and the like, or a combination comprising at least one of the foregoing. In a specific embodiment, the solvent can comprise dimethylformamide. In some embodiments, the solvent can comprise 2-ethoxyethyl acetate, 2-(2-ethoxy)ethoxyethyl acetate, 2-butoxyethyl acetate, ethyl acetate, butyl acetate, amyl acetate, other similar esters and ketones, or a combination comprising at least one of the foregoing. In some embodiments, nonreactive hydrocarbon solvents can be used, for example, benzene, toluene, xylene, and the like, or a combination comprising at least one of the foregoing. Combinations comprising any of the above solvents are also contemplated.

The contacting can be for a time and at a temperature effective to provide the deblocked isocyanate. For example, the contacting can be for a time of 15 minutes to 10 hours, or 15 minutes to 5 hours, or 15 minutes to 1 hour, or 20 to 40 minutes. The method of the present disclosure can provide the desired deblocked isocyanate across a range of temperatures. In some embodiments, ambient temperature can be preferred. In some embodiments, the contacting can be at a temperature of less than 100° C., or 5 to less than 100° C., or 10 to 50° C., or 10 to 40° C., or 10 to 30° C., or 15 to 30° C., or 15 to 25° C.

In some embodiments, the method can optionally further comprise contacting the deblocked isocyanate with a compound comprising at least one hydroxyl group (e.g., to form a urethane linkage). In some embodiments, contacting the deblocked isocyanate with the compound comprising at least one hydroxyl group can be after contacting the blocked isocyanate with the halide ion source to form the deblocked isocyanate. In some embodiments, the deblocking of the blocked isocyanate can be in the presence of the compound comprising at least one hydroxy group (i.e., contacting the deblocked isocyanate with the compound comprising at least one hydroxyl group can occur during the deblocking method, in the same reaction vessel).

Advantageously, the method can exclude the addition of deblocking agents comprising organometal compounds (e.g., organotin compounds), organophosphorus compounds (e.g., phosphoniums, phosphines, and the like), metal halides of tin, zinc, bismuth, titanium, magnesium, calcium, strontium or barium, or a combination of the foregoing deblocking agents.

In a specific embodiment, the method of deblocking an isocyanate comprises contacting a blocked isocyanate derived from an isocyanate compound comprising 2,4-toluene diisocyanate, 2,6-toluene diisocyanate, or a combination thereof, and a fluoride ion source comprising tetra-n-butylammonium fluoride, cesium fluoride, or a combination thereof, wherein the fluoride ion source is present in an amount of 3 to 7 mole percent, based on the total moles of the blocked isocyanate. The contacting is in the presence of a solvent, preferably dimethylformamide, at a temperature of 10 to 50° C., and for a time of 15 minutes to 1 hour, to provide the corresponding deblocked isocyanate.

Another aspect of the present disclosure is a method of making a polyurethane. The method comprises combining a blocked isocyanate, a polyol, and a halide ion source in the presence of a solvent and under conditions effective to provide the polyurethane.

The blocked isocyanate can be as described above. For example, the blocked isocyanate can be derived from an isocyanate compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof. Preferably, the blocked isocyanate can be derived from an isocyanate-containing compound comprising 2,4-toluene diisocyanate, 2,6-toluene diisocyanate, 4,4'-diphenylmethane diisocyanate, or a combination thereof. The blocking group of the blocked isocyanate can also be as described above, and, for example, can be a sec-propyl group, a tert-butyl group, a propargyl group, or a methyl pyrene group.

Alternatively, the blocked isocyanate useful for preparing the polyurethane according to the method of the present disclosure can comprise a blocked isocyanate prepolymer comprising repeating units according to formula (IV)

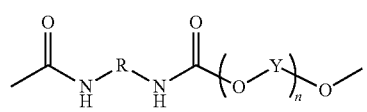

(IV)

wherein R, Y, and n are as described above, and the blocked isocyanate prepolymer further includes at least two blocked isocyanate end groups of formula (III). The prepolymers can be linear or branched. In some embodiments, the prepolymers include two blocked isocyanate end groups per prepolymer. In some embodiments, the prepolymers can include three, four, or more blocked isocyanate end groups per prepolymer, depending on the degree of branching of a given prepolymer. In some embodiments, the prepolymers can have a molecular weight of 1,000 to 75,000 grams per mole, or 2,000 to 50,000 grams per mole. The use of prepolymers as the blocked isocyanate component of the method of the present disclosure can be advantageous because prepolymers are typically easier to handle, have controlled viscosities, can improve compatibility between reaction components, can provide structural control over the final polyurethane, and can provide final polyurethane products having improved physical properties.

As used herein, the term "polyol" refers to a compound having at least two hydroxyl groups. In some embodiments, the polyol can have exactly two hydroxyl groups (i.e., a diol). In some embodiments, the polyol can be three, four, five, or more hydroxyl groups per molecule. Polyols useful in the present method can be straight, branched, or cyclic. For example, the polyol can be of formula (V)

wherein $R^1$ is a substituted or unsubstituted $C_{2-18}$ alkylene group or cycloalkylene group, a group of formula (VI)

wherein $R^2$ is a group of formula (VII)

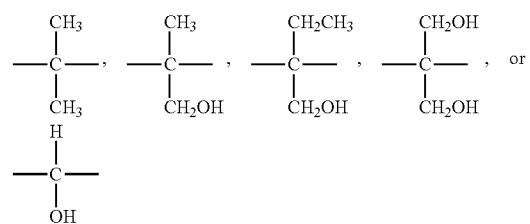

or a group of formula (VIII)

wherein $R^3$ is independently at each occurrence a $C_{1-6}$alkylene group, and n is an integer of 1 to 200. Examples of suitable polyols can include, but are not limited to, ethylene glycol, diethylene glycol, triethylene glycol, propylene glycol, dipropylene glycol, trimethylene glycol, butylene glycols, neopentyl glycol, 1,2-cyclohexandiol, poly(oxyalkylene) polyols obtained by the condensation of ethylene oxide, propylene oxide, or a combination thereof, glycerol, 1,1,1-trimethylolpropane, 1,1,1-trimethylolethane (also known as 1,1,1-tris(hydroxymethyl)ethane), 2,2-dimethyl-1,3-propane diol, pentaerythritol, or a combination comprising at least one of the foregoing. In some embodiments, preferred polyols can include the poly- and oligoalkylene glycols of the formula —(R³O)ₙ—R³—, for example, polyethylene glycols, polypropylene glycols, diethylene glycol, triethylene glycol, tetraethylene glycol, and combinations comprising at least one of the foregoing. In a specific embodiment, the polyol can be triethylene glycol. In another specific embodiment, the polyol can comprise 1,1,1-tris(hydroxymethyl)ethane.

The blocked isocyanate and the polyol can be present in a molar ratio of 0.9:1 to 1.1:1, or 0.95:1 to 1.05:1.

The method of making the polyurethane further comprises combining a halide ion source with the blocked isocyanate and the polyol. The halide ion source can be as described above, and can be a fluoride ion source, a chloride ion source, a bromide ion source, an iodide ion source, or a combination thereof. In a specific embodiment, the halide ion source comprises a fluoride ion source. Preferably, the fluoride ion source can comprise tetra($C_{1-6}$alkyl)ammonium fluoride, potassium fluoride, sodium fluoride, cesium fluoride, lithium fluoride, lithium tetrafluoroborate, hydrogen fluoride, hydrogen fluoride pyridine, or a combination thereof.

Combining the blocked isocyanate, the polyol, and the halide ion source is performed in the presence of a solvent and under conditions effective to provide the polyurethane. Generally, any solvent capable of solubilizing the reaction components (i.e., the blocked isocyanate, the polyol, and the halide ion source) can be used provided that the solvent is not reactive towards the halide ion source or the deblocked isocyanate product (e.g., the solvent can be nucleophile-free (e.g., free of hydroxyl groups, amine groups, and the like) so as not to participate in the polymerization reaction). In some embodiments the solvent can comprise a nonpolar solvent such as dioxane. In a preferred embodiment, the solvent is a polar aprotic solvent. Exemplary polar aprotic solvents can include dimethylformamide, dimethylsulfoxide, N-methyl-2-pyrrolidone, tetrahydrofuran, and the like, or a combination comprising at least one of the foregoing. In a specific embodiment, the solvent can comprise dimethylformamide. In some embodiments, the solvent can comprise 2-ethoxyethyl acetate, 2-(2-ethoxy)ethoxyethyl acetate, 2-butoxyethyl acetate, ethyl acetate, butyl acetate, amyl acetate, other similar esters and ketones, or a combination comprising at least one of the foregoing. In some embodiments, nonreactive hydrocarbon solvents can be used, for example, benzene, toluene, xylene, and the like, or a combination comprising at least one of the foregoing. Combinations comprising any of the above solvents are also contemplated for use in the present method.

The polymerization can be conducted at a temperature of 30 to 70° C., or 40 to 60° C., or 45 to 55° C., and for a time of 1 to 10 hours, or 1 to 8 hours, or 2 to 8 hours.

The polyurethane provided by the method disclosed herein can comprise repeating units of formula (IX)

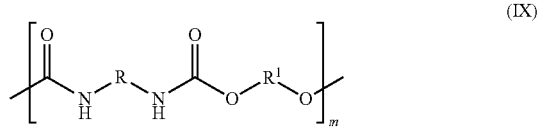

(IX)

wherein R is derived from a diisocyanate and is independently at each occurrence a substituted or unsubstituted $C_{1-18}$ alkylene group or a substituted or unsubstituted $C_{6-20}$ arylene group. $R^1$ is independently at each occurrence a group derived from the polyol, specifically wherein the polyol is a diol. $R^1$ can be a substituted or unsubstituted $C_{2-18}$ alkylene group or cycloalkylene group, a group of formula (V), or a group of formula (VII), as described above. In some embodiments, $R^1$ can be derived from a poly- or oligoalkylene glycol group, preferably a triethylene glycol group.

The polyurethane can have a number average molecular weight of 1,000 to 100,000 grams per mole, or 2,000 to 75,000 grams per mole, or 2,000 to 50,000 grams per mole. Molecular weight of the polyurethanes can be determined using known techniques, for example, gel permeation chromatography relative to polystyrene standards.

In some embodiments, the resulting polyurethane can be a crosslinked polyurethane. For example, when the polyol comprises more than 2 hydroxyl groups the polyurethane can be a crosslinked polyurethane. Alternatively, or additionally, when the blocked isocyanate is derived from an isocyanate containing at least three isocyanate groups per molecule, or when the blocked isocyanate comprises a blocked isocyanate prepolymer that is branched such that it contains three or more blocked isocyanate end groups, the polyurethane can be a crosslinked polyurethane.

The method of making the polyurethane described herein can also be useful for the preparation of polyurethane foams. For example, a blocked polyurethane prepolymer can be deblocked according to the method described above and mixed with a suitable crosslinked (e.g., a diol) in the presence of a foaming agent to provide a foamed material. The foaming agent can be any foaming agents that are generally known. In some embodiments, the foaming agent can be water. An exemplary procedure for the production of foamed polyurethane materials is further described in the working examples below.

The methods of the present disclosure are further illustrated by the following non-limiting examples.

EXAMPLES

Figure 1B:
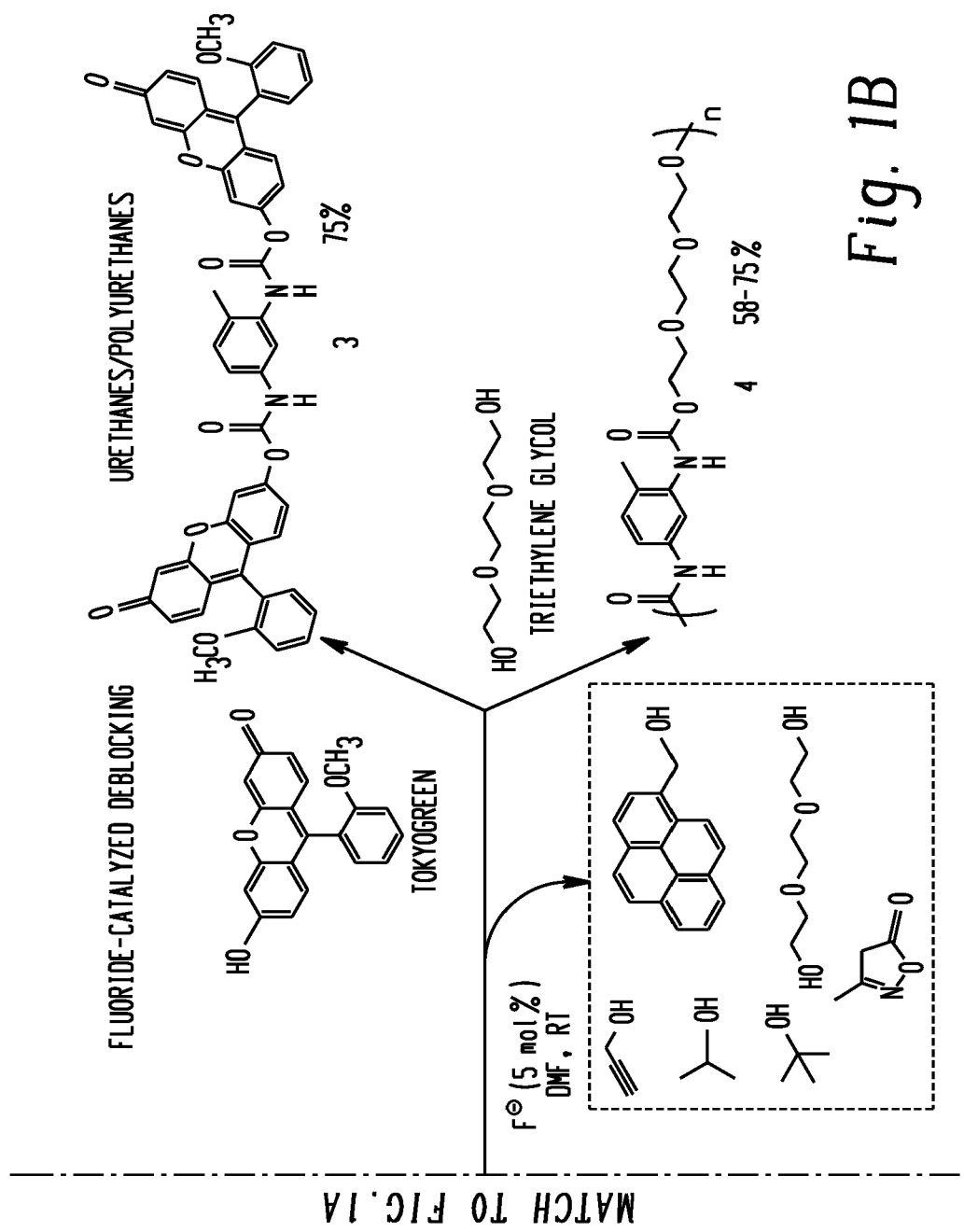

As shown in FIG. 1, blocked isocyanates 2a-f were prepared by reacting toluene diisocyanate (TDI) with selected primary alcohols in anhydrous dimethylformamide (DMF). The reactions were monitored by infrared spectroscopy, showing disappearance of isocyanate (—NCO) signals (2265 $cm^{-1}$) and emergence of signals for the urethane carbonyl (1710-1716 $cm^{-1}$) and N—H (3326 $cm^{-1}$) groups. For the pyrene-blocked sample, proton nuclear magnetic resonance ($^1$H NMR) spectroscopy revealed aromatic resonances from 8.05 to 8.35 ppm (pyrene) and 7.05-7.25 ppm (TDI), as well as broad N—H resonances at 9.05 and 9.75 ppm. The fluorescence spectrum of pyrene-blocked TDI exhibited characteristic vibronic bands at 395 nm (0-0 transition) and 415 nm (0-2 transition), as well as a broad excimer emission at 480 nm.

Figure 2:
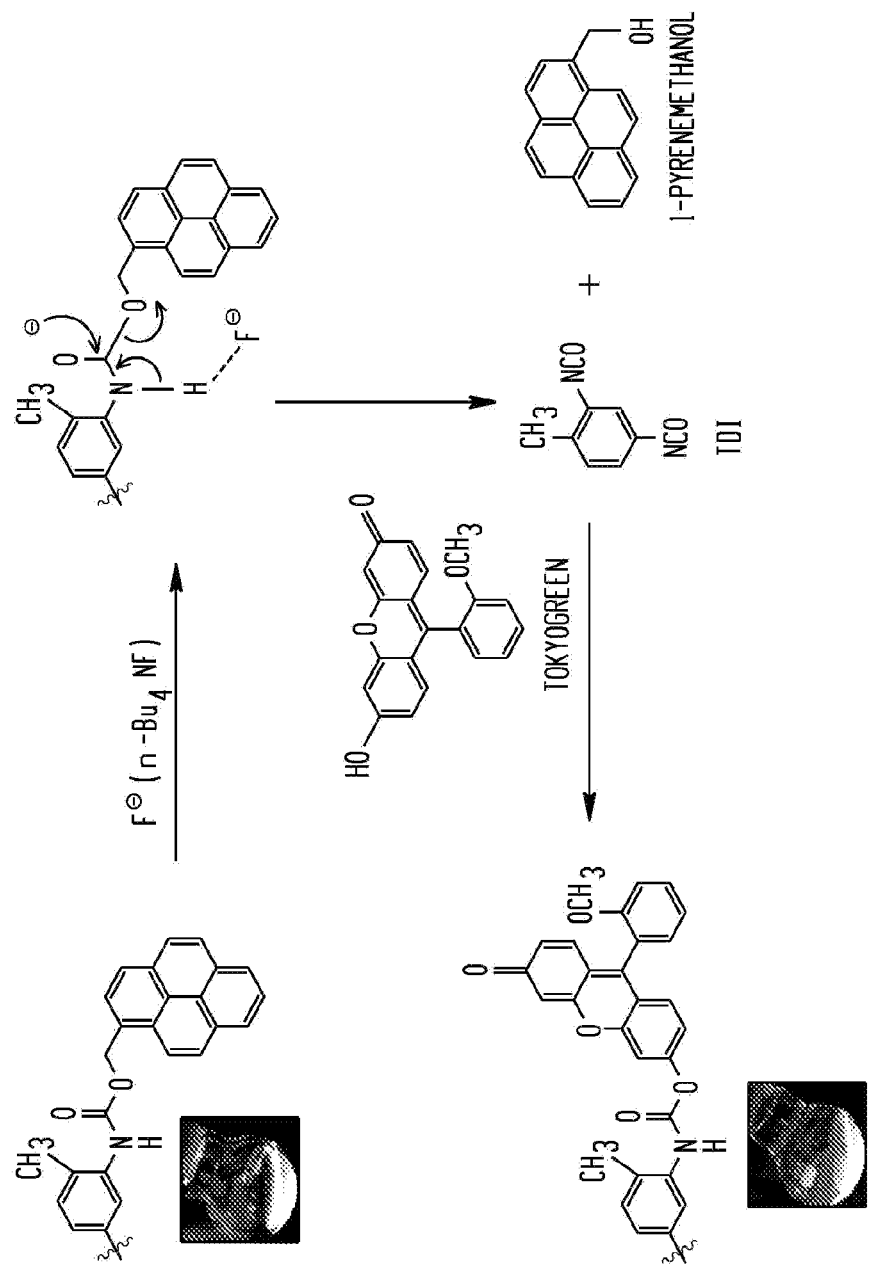
FIG. 2 is a chemical scheme showing the fluoride-catalyzed conversion of pyrene to Tokyo Green (TG) blocked toluene diisocyanate (TDI) and the photographs show the corresponding color changes of the solutions (from blue (top left) to orange (bottom left)).

In general, the coordination chemistry of anions depends on both ionic and dipolar interactions between substrate and receptor. The present inventors investigated urethane deblocking using the halide series—fluoride, chloride, bromide, and iodide—as well as hydroxide and carbonate anions. As illustrated in FIG. 2, addition of 5 mole percent of tetra-n-butylammonium fluoride (n-Bu$_4$NF) to pyrene-blocked TDI led to an immediate loss of pyrene fluorescence, due to elimination and precipitation of pyrene. Similar experiments performed with n-Bu$_4$NCl produced only a small fluorescence reduction, while n-Bu$_4$NBr and n-Bu$_4$NI afforded no visual change to the solution. DMF solutions of CsF performed similarly to n-Bu$_4$NF, prompting further investigation into the effect of fluoride ion on urethane deblocking and as a catalyst for the preparation of polyurethanes from blocked isocyanate monomers.

Figure 3A:
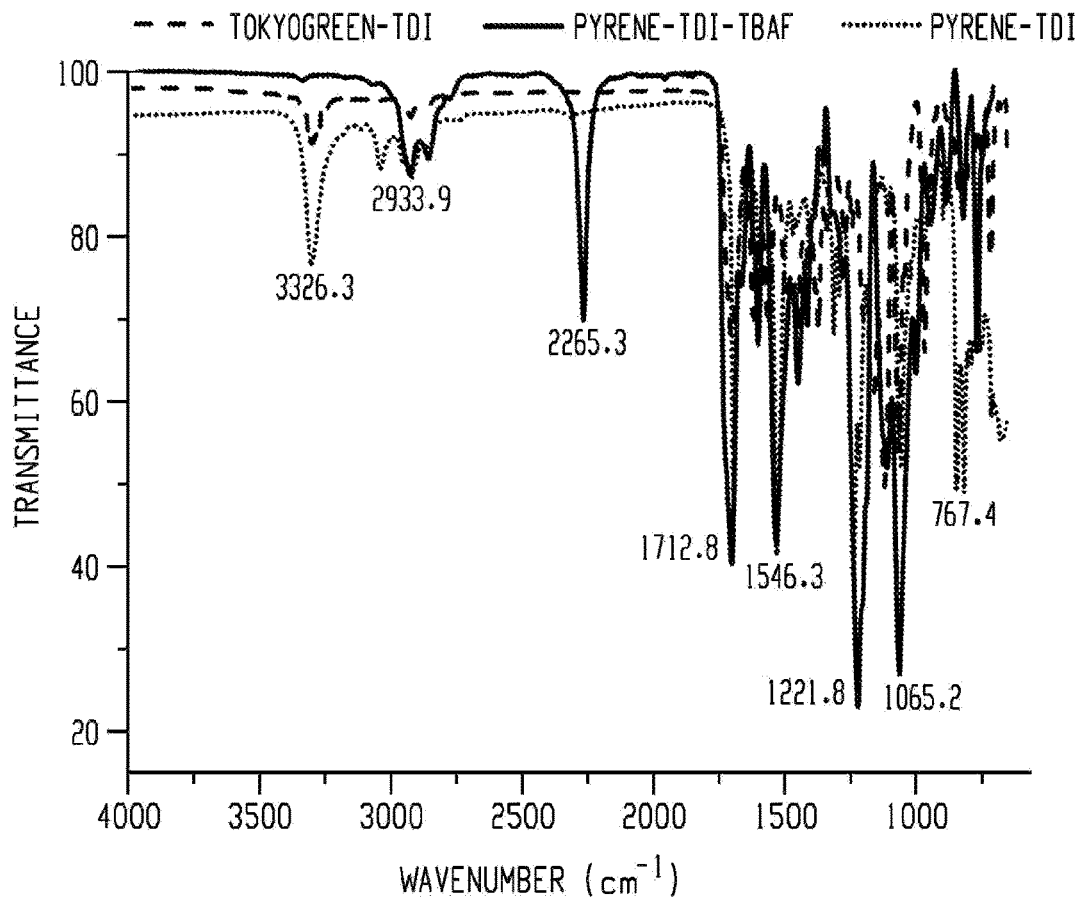
FIG. 3 shows (a) the FTIR spectrum of pyrene-blocked TDI (bottom trace) and spectra after fluoride-catalyzed deblocking (top trace) and addition of TG (middle trace) and (b) the normalized absorption and PL spectra of pyrene and TG-blocked TDI.
Figure 3B:
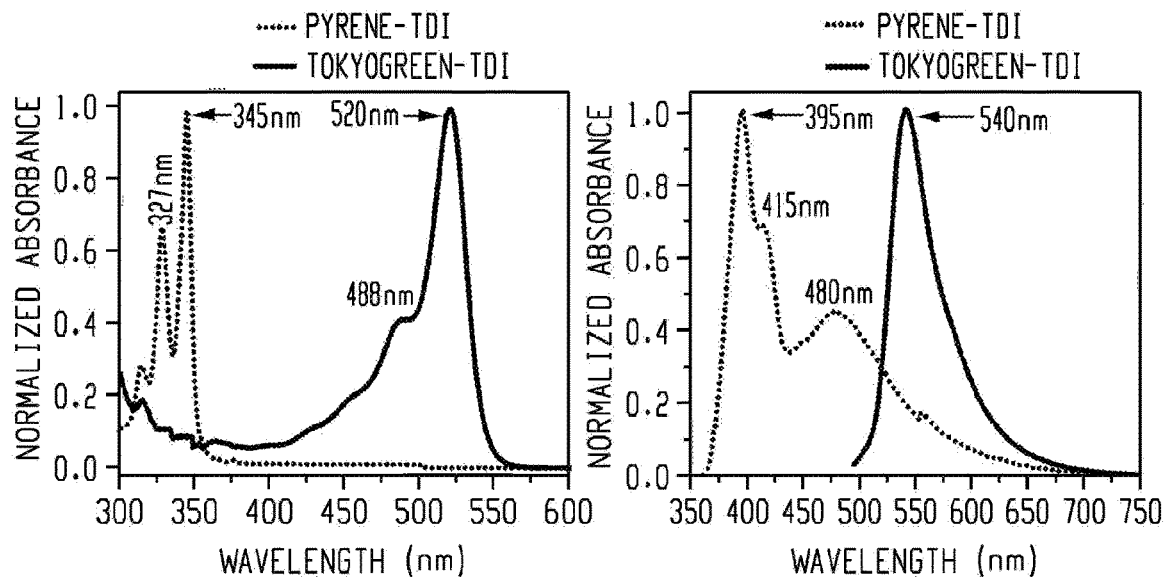

In monitoring deblocking and exchange of nucleophilic groups, FTIR analysis of an aliquot taken from the reaction mixture 5 minutes after addition of n-Bu$_4$NF showed a characteristic NCO stretching band at 2265 $cm^{-1}$. Additionally, $^1$H NMR spectroscopy confirmed the disappearance of N—H signals from 9.1-9.8 ppm, while signals typical of TDI re-emerged. Upon addition the phenolic TokyoGreen (TG), a rapid color change, from blue to yellow, was observed as the generated isocyanate was consumed. The TG-blocked TDI products were obtained in 75-80% yield, with structural confirmation by FTIR, $^1$H NMR, ESI-MS, and UV-Vis spectroscopy (FIG. 3). FTIR spectroscopy showed characteristic bands at 1712 cm$^{-1}$ and 3326 cm$^{-1}$ for the carbonyl and N—H groups, respectively (FIG. 3a). $^1$H NMR spectroscopy signals corresponding to TG (6.45-7.80 ppm), characteristic TDI resonances from 7.20-7.30 ppm, and broad NH resonances at 9.10 and 9.62 ppm, confirmed the desired deblocking and nucleophile exchange. The TG-blocked compound fluoresced bright yellow under UV-light, with absorption and photoluminescence (PL) emission at 520 nm and 540 nm, respectively (FIG. 3b).

Figure 4:
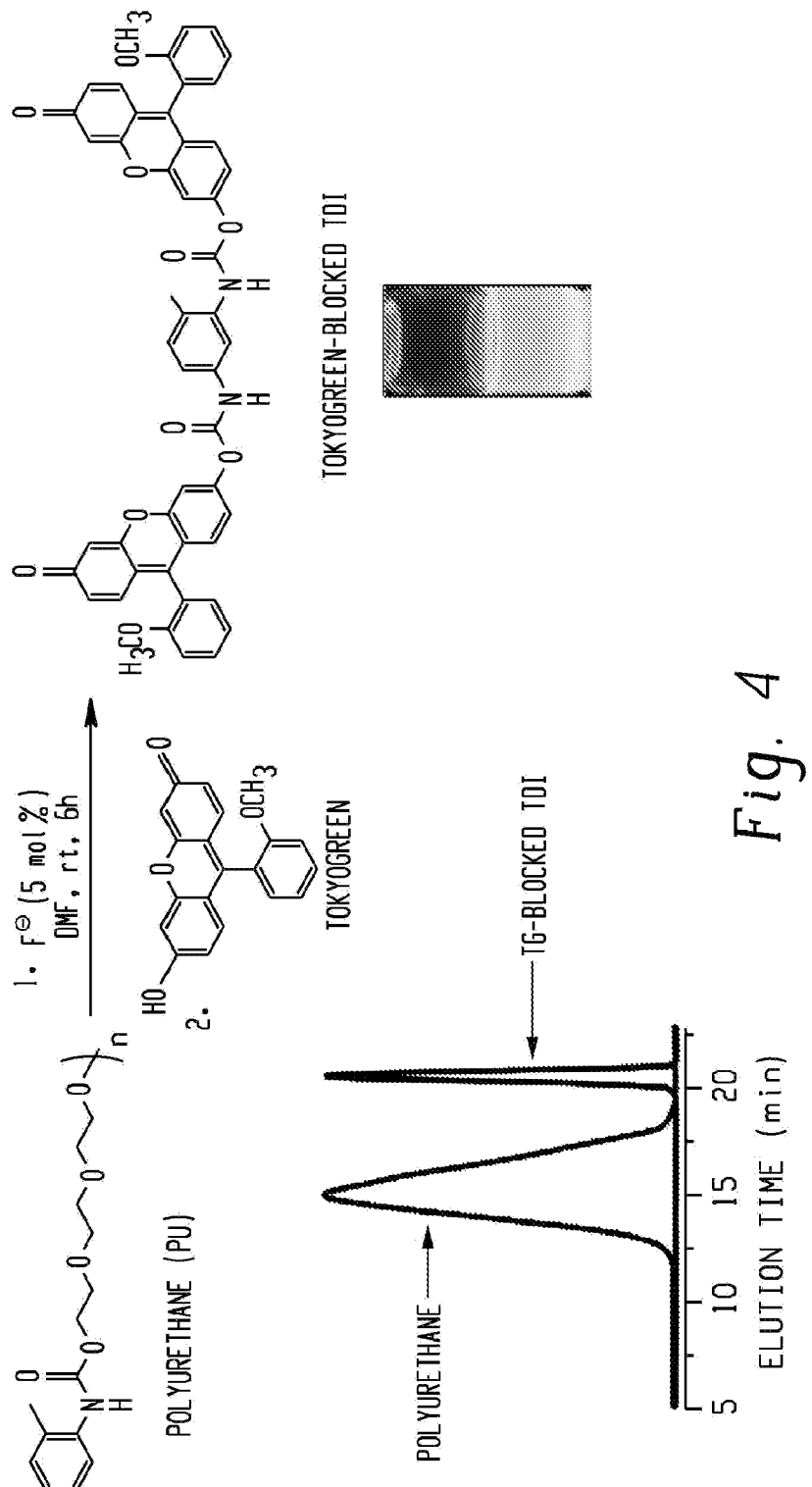
FIG. 4 is a chemical scheme illustrating the fluoride-catalyzed deblocking of polyurethane 2e with TG.

This fluoride-catalyzed deblocking was tested on polyurethane 2f of FIG. 1 having repeating units derived from TDI and tetraethylene glycol, and a number average molecular weight (Mn) of about 30,000 grams per mole, as determined by gel permeation chromatography in DMF relative to polystyrene standards. This was done in anhydrous DMF with 5 mole percent n-Bu$_4$NF or CsF, followed by addition of 2.0 molar equivalents TG (based on molar equivalents TDI) to afford a product which by $^1$H NMR, FTIR, GPC, and UV-Vis spectroscopies confirmed successful deblocking and conversion of the polyurethane to the corresponding bis-TG-substituted aromatic product, as shown in FIG. 4. Similar experiments were conducted on conventional blocked isocyanates prepared from TDI or methylene diphenyl diisocyanate (MDI) with propargyl alcohol, isopropanol, and tert-butanol. The relatively low boiling points of these alcohols allowed their removal under vacuum after deblocking, driving product formation.

In a typical reaction, after 30 minutes stirring under vacuum (500 mbar), the mixture was returned to ambient pressure, water was added, and the product was recovered as an orange solid in 75-80% yield. The $^1$H NMR spectrum showed the disappearance of signals corresponding to the original blocking groups as well as the appearance of TG resonances. Approximately 5 mol % fluoride ion was preferred, with lower catalytic loadings (2-3 mol %) leading to longer reaction times (5 hours or greater) or only partial deblocking.

The stability of blocked isocyanates makes them attractive for long-term storage and for reducing concerns associated with exposure and toxicity. Coupling those advantages with convenient, catalytic polymerization methodology is attractive for the preparation of polyurethanes. As shown in FIG. 5, blocked isocyanates 2a-e were used to prepare polyurethanes, starting from a slight molar excess of the blocked structure relative to diol. Attempted polymerizations at room temperature led to little evolution of molecular weight, but at 50° C. the polymerizations proceeded smoothly, affording polyurethanes 4a-e with Mn values of 8,000-10,000 grams per mole. When the polymerizations were conducted at 50° C. for 6 hours under vacuum (500 mbar), molecular weight values were significantly higher, with number average molecular weights up to 27,000 grams per mole (FIG. 5b, Table 1) with PDI values of 2.3-3.1. Polymers 4a-e were obtained as white solids in yields of 60-75%; notably, in the case of 4e, residual pyrenemethanol was removed by extraction into CH$_2$Cl$_2$ and the polyurethane obtained had no fluorescent signature, confirming the absence of the original blocking group in the polymer structure. Similar experiments were conducted on blocked isocyanates prepared from MDI, generating polyurethanes 4f-j with Mn values of 12,000 to 18,000 grams per mole and with dispersities of 1.2 to 1.9. These fluoride-catalyzed polyurethane syntheses, monitored by GPC, exhibited classic step-growth polymerization kinetics, with little molecular weight increase early in the reaction timeframe, and rapid molecular weight growth in the later stages. These polymerizations predict easy scalability, as they were conducted on a 2 gram scale without difficulty. Results of polymerizations including number average molecular weight (Mn; grams per mole), polydispersity (PDI), and yield (%) are provided in Table 1.

TABLE 1

| Example | Blocked Isocyanate | Polyurethane | Mn (g/mol)[1] | PDI[1] | Yield (%)[2] |
|---|---|---|---|---|---|
| 1 | 2a | 4a | 21,000 | 3.1 | 73 |
| 2 | 2b | 4b | 27,000 | 2.8 | 70 |
| 3 | 2c | 4c | 25,000 | 3.1 | 72 |
| 4 | 2d | 4d | 28,000 | 2.4 | 75 |
| 5 | 2e | 4e | 19,000 | 2.3 | 58 |
| 6 | 2f | 4f | 18,000 | 1.6 | 68 |
| 7 | 2g | 4g | 16,000 | 1.2 | 65 |
| 8 | 2h | 4h | 14,000 | 1.5 | 60 |
| 9 | 2i | 4i | 18,000 | 1.4 | 65 |
| 10 | 2j | 4j | 12,000 | 1.9 | 52 |

[1]Mn and PDI values estimated by GPC eluting with DMF calibrated against polystyrene standards;
[2]Isolated product yield after precipitation.

Figure 6:
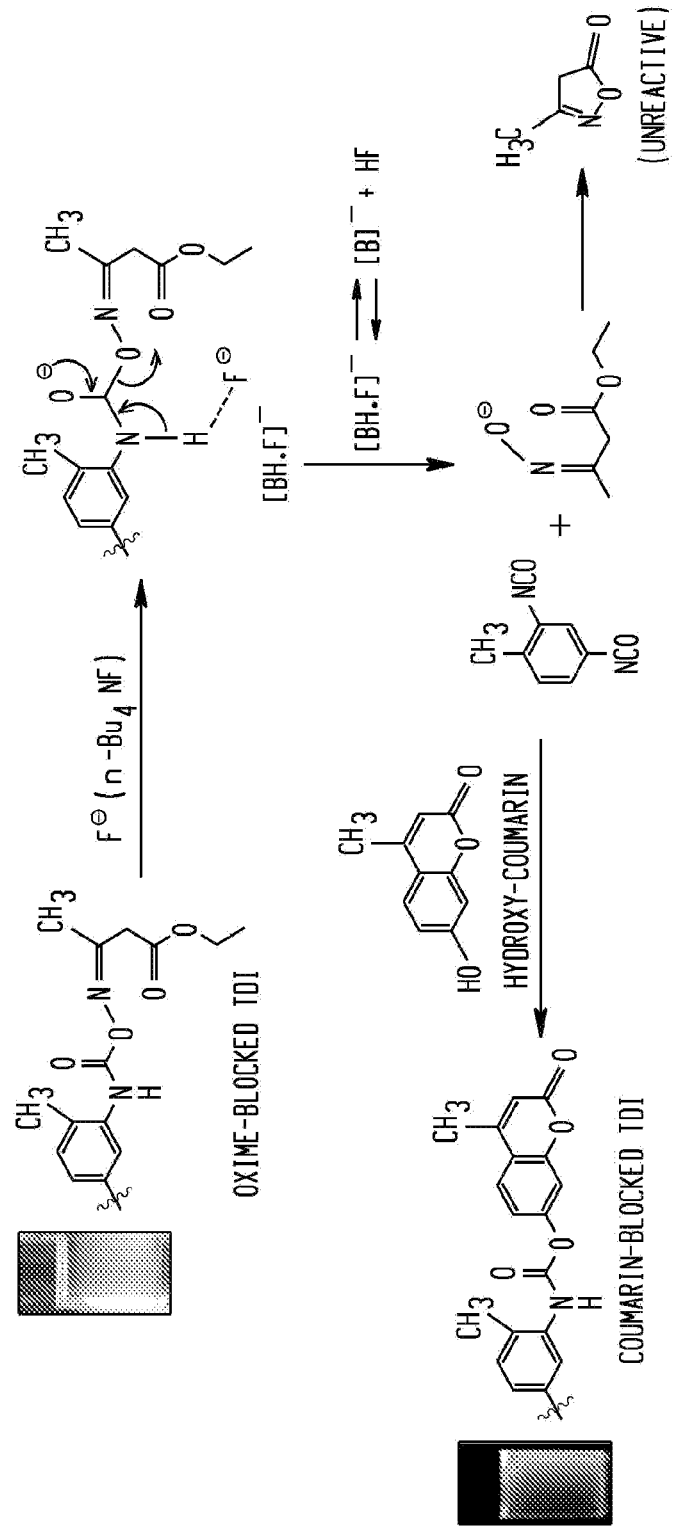
FIG. 6 shows fluoride-catalyzed urethane exchange, from oxime-to-coumarin, and photographs of the corresponding solutions.

The present inventors also examined a blocking agent which, following deblocking, undergoes chemistry to render it unreactive with the generated isocyanate. Oxime blocking agents undergo intramolecular cyclization to yield 3-methylisoxazol-5-one. Oxime-blocked isocyanate 2d, derived from ethyl acetoacetate oxime (EAO), for fluoride-catalyzed deblocking (FIG. 6). Addition of F— caused deblocking and release of EAO, and the generated isocyanate was subsequently treated with 4-methylumbelliferone to form the bright blue fluorescent coumarin-blocked isocyanate. The product was isolated in 86% yield and characterized by NMR, FTIR, UV-Vis, and fluorescence spectroscopy. Notably, polymerizations conducted with 2d at 50° C. without vacuum afforded polyurethane with Mn value of 28,000 grams per mole in good yield (65-75%) since removal of deblocked structure from solution is unnecessary.

Figure 7:
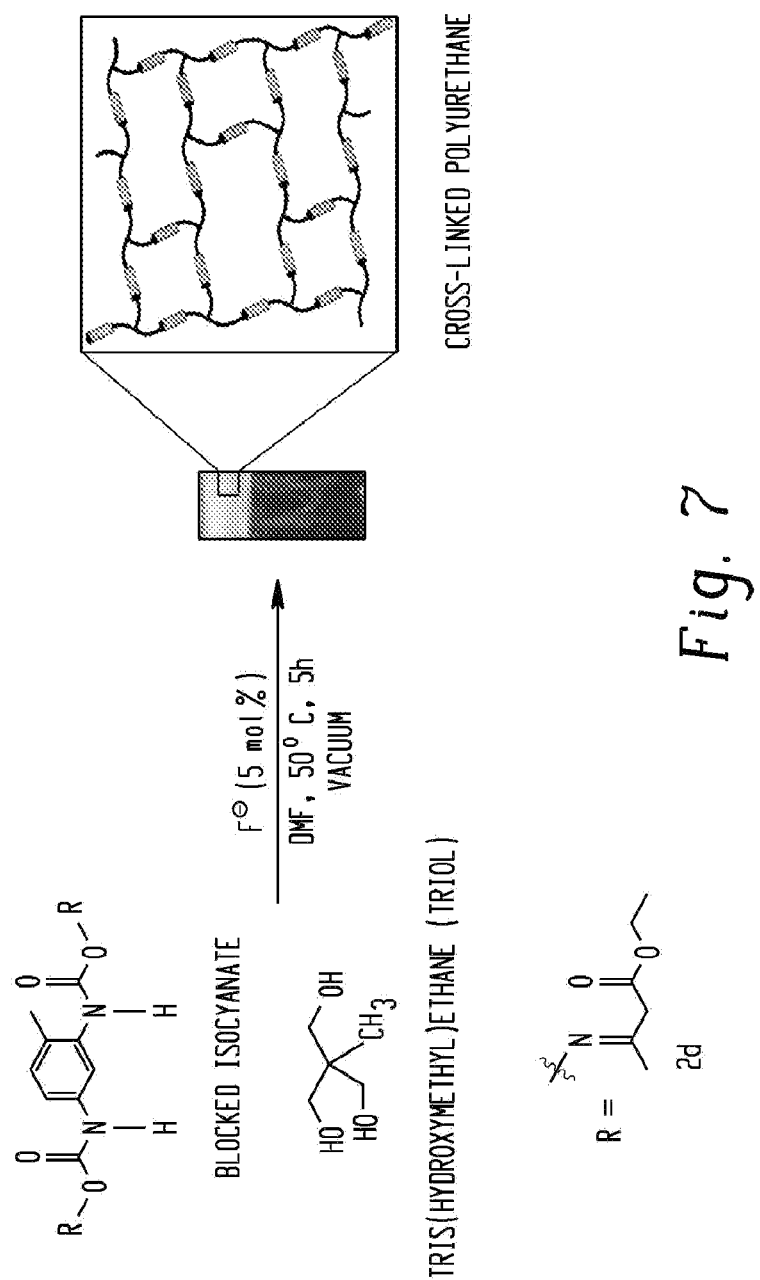
FIG. 7 illustrates the preparation of cross-linked polyurethanes by sequential fluoride-catalyzed deblocking of and polymerization with a 1,1,1-trishydroxymethylethane.

This fluoride-catalyzed methodology is anticipated applicable to many types of polyurethane structures. As shown in FIG. 7, the solution of blocked isocyanates 2a-d (3 mmol) in DMF was first treated with 5 mol % of n-Bu$_4$NF or CsF followed by addition of the triol (2 mmol) to afford cross-linked polyurethanes by this A$_2$+B$_3$ polymerization. As expected, these polymerizations resulted in gels, as shown in FIG. 7, and the resultant polymers were insoluble in DMF and all other organic solvents tried. Polyurethane-based thin films, coatings, printed objects, and other types of structures from blocked urethanes should be similarly amenable to this halide-catalyzed process.

Figure 8:
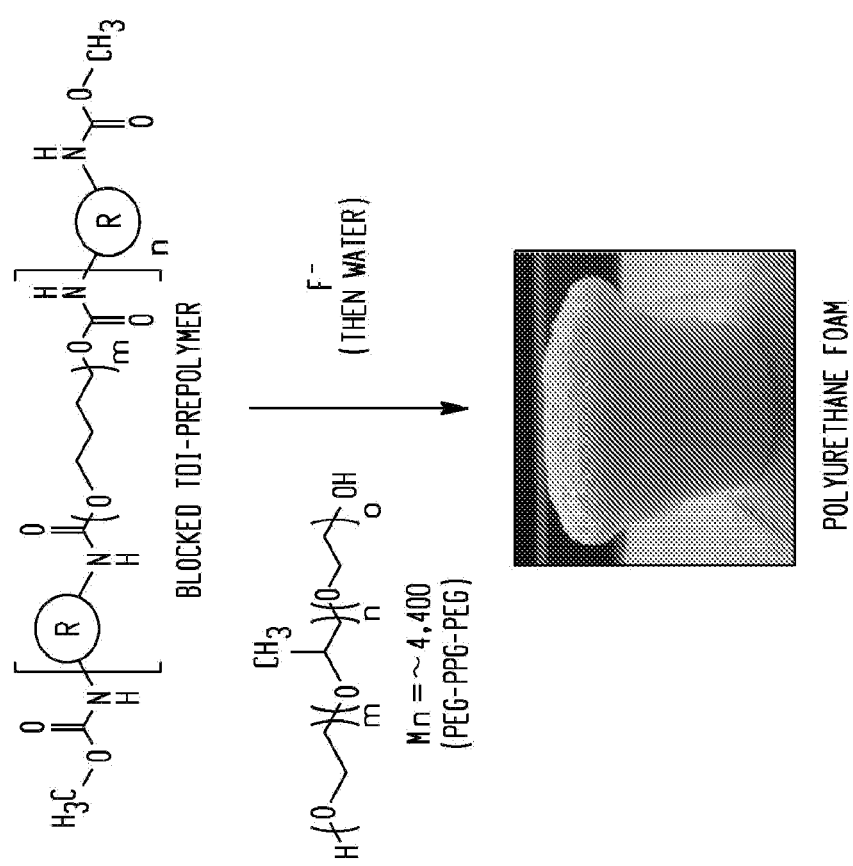
FIG. 8 shows the preparation of a polyurethane foam.

Additionally, the deblocking and polyurethane synthesis techniques described above are applicable to the preparation of polyurethane-based materials. For example, a methanol-blocked TDI-prepolymer was combined with 5 mol % n-Bu$_4$NF and the mixture was stirred at room temperature for 5 min. To this mixture, the triblock copolymer poly(ethylene glycol)-block-poly(propylene glycol)-block-poly(ethylene glycol) (a diol) was added, followed by water as foaming agent, to ultimately afford the polyurethane foam shown in FIG. 8.

In summary, described herein is a new method for urethane deblocking and polyurethane formation which exploits fluoride ion as an efficient catalyst and is conducted under mild conditions. The propensity of fluoride anion to engage in deblocking of urethanes and generates reactive isocyanates for subsequent polymerization is demonstrated.

Selection of fluorescent blocking agents enabled easy visual and spectroscopic monitoring of these reactions, and this method is expected to expand the scope of metal-free deblocking of polyurethanes under both solution and bulk polymerization conditions.

Experimental details follow.

Materials and Methods. Starting materials, reagents, and solvents were purchased from commercial suppliers and used without further purification unless otherwise stated. Fluorescein was purchased from TCI America, N,N-Dimethylformamide (DMF), Tolylene-2,4-diisocyanate (TDI), 4,4'-Methylene diphenyl diisocyanate (MDI), 1-Pyrenemethanol, Propargyl alcohol, sec-Propyl alcohol, tert-Butanol, Triethylene glycol, Dibutyltin dilaurate (DBTL), Tetra-n-butylammonium halides, and Cesium fluoride were used as obtained from Sigma Aldrich. Proton nuclear magnetic resonance spectra CH NMR) were recorded on Bruker Avance-500 (500 MHz). Chemical shifts are reported in ppm relative to the residual $(CH_3)_2SO$ signal in $(CD_3)_2SO$. $^{13}C$ NMR spectra were recorded on a Bruker Avance-500 (125 MHz) instrument. High resolution mass spectral data were obtained on a Bruker MicrOTOF ESI-TOF Mass Spectrometer. Absorption and fluorescence spectra were obtained with UV-2600, UV-VIS spectrophotometer and RF-6000, spectro fluorophotometer manufactured by Shimadzu, USA instruments. IR data were recorded on a Perkin-Elmer Spectrum One FT-IR spectrometer equipped with a universal ATR sampling accessory. GPC elution was accomplished using N,N-Dimethylformamide (DMF) (with 0.01 M Lithium chloride) as the mobile phase, and polystyrene calibration standards, operating at 1.0 mL/min at 50° C. with two Agilent PLgel 5 μm MIXED-D columns (300×7.5 mm) equipped with refractive index (RI) detection.

General synthesis of blocked toluene diisocyanate (TDI). The blocked isocyanates were synthesized by taking two equivalents (13.90 mmol) of corresponding blocking agents (e.g., propargyl alcohol, sec-propyl alcohol, tert-butyl alcohol, 1-pyrenemethanol, or triethylene glycol) in anhydrous dimethylformamide (DMF). To this solution, 5 mol % of dibutyltin dilaurate (DBTL) was added, and the reaction was continuously stirred at room temperature for 10 minutes. To the reaction mixture, one equivalent of 2,4-toluene diisocyanate (6.95 mmol) was added and the reaction mixture was stirred for 6 hours. After completion, the reaction was quenched by adding water and the white precipitate formed was collected by filtration, and dried under vacuum to yield 80-95% of compounds 2a-2f.

Characterization of each of the blocked TDIs follows.

Propargyl alcohol-blocked TDI (2a): $^1H$ NMR (500 MHz, DMSO-$d_6$, δ, ppm): 2.14 (s, 3H), 3.54 (s, 1H), 4.74 (s, 4H), 7.10-7.20 (dd, 2H), 7.51 (s, 1H), 9.06 (br, 1H), 9.78 (br, 1H); $^{13}C$ NMR (125 MHz, DMSO-$d_6$, δ, ppm): 31.25, 52.42, 77.72, 77.79, 79.45, 79.55, 122.68, 126.62, 130.63, 130.89, 136.61, 137.29, 153.06, 153.92, 162.83; HRMS-EI (m/z): $[M+Na]^+$ calculated for $C_{15}H_{14}N_2O_4$: 309.0846, found: 309.1691.

sec-Propyl alcohol-blocked TDI (2b): $^1H$ NMR (500 MHz, DMSO-$d_6$, δ, ppm): 1.24 (d, 12H), 2.11 (s, 3H), 4.87 (s, 2H), 7.04-7.15 (dd, 2H), 7.51 (s, 1H), 8.68 (br, 1H), 9.44 (br, 1H); $^{13}C$ NMR (125 MHz, DMSO-$d_6$, δ, ppm): 31.13, 36.23, 67.60, 67.78, 122.36, 130.44, 137.00, 137.75, 137.83, 137.98, 153.11, 153.58, 154.37, 162.76; HRMS-EI (m/z): $[M+Na]^+$ calculated for $C_{15}H_{22}N_2O_4$: 317.1472, found: 317.2335.

tert-Butyl alcohol-blocked TDI (2c): $^1H$ NMR (500 MHz, DMSO-$d_6$, δ, ppm): 1.47 (s, 18H), 2.11 (s, 3H), 7.03-7.15 (dd, 2H), 7.49 (s, 1H), 8.49 (br, 1H), 9.21 (br, 1H); $^{13}C$ NMR (125 MHz, DMSO-$d_6$, δ, ppm): 31.18, 36.19, 78.99, 130.35, 130.40, 130.64, 137.11, 137.28, 137.94, 138.09, 138.15, 152.91, 153.24, 153.94, 162.73; HRMS-EI (m/z): $[M+Na]^+$ calculated for $C_{17}H_{26}N_2O_4$: 345.1785, found: 345.2772.

Oxime blocked TDI (2d): $^1H$ NMR (500 MHz, DMSO-$d_6$, δ, ppm): 1.27-1.30 (t, 6H), 2.06 (s, 3H), 2.26 (s, 6H), 3.03 (s, 4H), 4.18-4.24 (q, 4H), 7.07-7.12 (m, 2H), 7.43 (s, 1H), 9.11 (br, 1H), 10.08 (br, 1H). $^{13}C$ NMR (125 MHz, DMSO-$d_6$, δ, ppm): 14.33, 31.19, 36.21, 43.81, 62.63, 124.68, 126.10, 130.88, 138.17, 138.36, 138.44, 153.39, 153.54, 157.64, 159.57, 162.73. HRMS-EI (m/z): $[M+Na]^+$ calculated for $C_{21}H_{28}N_4O_8$: 487.1799, found: 487.3651.

Pyrenemethanol-blocked TDI (2e): $^1H$ NMR (500 MHz, DMSO-$d_6$, δ, ppm): 2.13 (s, 3H), 5.90 (s, 4H), 7.06-7.12 (dd, 2H), 7.22 (s, 1H), 8.18 (m, 2H), 8.19-8.20 (m, 6H), 8.30 (m, 8H), 8.31 (m, 2H), 9.03 (br, 1H), 9.76 (br, 1H); $^{13}C$ NMR (125 MHz, DMSO-$d_6$, δ, ppm): 31.22, 64.46, 64.61, 123.60, 123.65, 124.26, 124.42, 125.16, 125.91, 125.94, 125.99, 126.80, 127.79, 128.05, 128.12, 128.42, 128.45, 128.48, 129.27, 130.45, 130.60, 130.69, 131.19, 131.43, 137.68, 138.15, 153.14, 153.93, 154.79, 162.78; HRMS-EI (m/z): $[M+Na]^+$ calculated for $C_{43}H_{30}N_2O_4$: 661.2098, found: 661.4018.

Triethylene glycol blocked TDI polymer (20: $^1H$ NMR (500 MHz, DMSO-$d_6$, δ, ppm): 2.09 (s, 3H), 3.57 (s, 4H), 3.64 (s, 4H), 4.18 (s, 4H), 7.05-7.17 (dd, 2H), 7.51 (s, 1H), 8.90 (br, 1H), 9.65 (br, 1H); $^{13}C$ NMR (125 MHz, DMSO-$d_6$, δ, ppm): 31.14, 52.08, 60.69, 63.90, 64.04, 69.20, 70.19, 72.84, 115.52, 123.70, 126.30, 130.68, 136.86, 137.60, 153.89, 154.74, 162.78.

General synthesis of blocked methylene diphenyl diisocyanates (MDI). The blocked isocyanates were synthesized by taking two equivalents (8.00 mmol) of corresponding blocking agents (e.g., propargyl alcohol, isopropyl alcohol, tert-butyl alcohol, 1-pyrenemethanol, or triethylene glycol) in anhydrous dimethylformamide (DMF). To this solution, 5 mol % of dibutyltin dilaurate (DBTL) was added, reaction was continued stirring at room temperature for 10 min. To the above reaction mixture, one equivalent of methylene diphenyl diisocyanate (4.00 mmol) was added and the reaction mixture was continued stirring for 6 hrs. After completion, the reaction was quenched by adding water and the white precipitate formed was collected by filtration, dried under vacuum to provide the desired blocked MDI (2f-2j) in 85-95% yield.

Characterization of each of the blocked MDIs follows.

Propargyl alcohol-blocked MDI (20: Yield 95%; $^1H$ NMR (500 MHz, DMSO-$d_6$, δ, ppm): 3.35 (s, 2H), 3.83 (s, 3H), 4.74 (s, 4H), 7.11-7.13 (d, 4H), 7.35-7.37 (d, 4H), 9.76 (br, 2H); $^{13}C$ NMR (125 MHz, DMSO-$d_6$, δ, ppm): 43.72, 52.32, 77.99, 79.47, 118.93, 129.40, 136.27, 137.17, 153.08; HRMS-EI (m/z): $[M+Na]^+$ calculated for $C_{21}H_{18}N_2O_4$: 385.1159, found: 385.2256.

sec-Propyl alcohol-blocked MDI (2g): Yield 82%; $^1H$ NMR (500 MHz, DMSO-$d_6$, δ, ppm): 1.23 (d, 12H), 3.78 (s, 3H), 4.85-4.90 (m, 2H), 7.08-7.09 (d, 4H), 7.36-7.38 (d, 4H), 9.44 (br, 2H); $^{13}C$ NMR (125 MHz, DMSO-$d_6$, δ, ppm): 22.43, 44.23, 67.72, 118.76, 129.25, 135.80, 137.70, 153.62. HRMS-EI (m/z): $[M+Na]^+$ calculated for $C_{21}H_{26}N_2O_4$: 393.1785, found: 393.2904.

tert-Butyl alcohol-blocked MDI (2h): Yield 76%; $^1H$ NMR (500 MHz, DMSO-$d_6$, δ, ppm): 1.47 (s, 18H), 3.79 (s, 2H), 7.10-7.12 (d, 4H), 7.35-7.37 (d, 4H), 8.54 (br, 2H); $^{13}C$ NMR (125 MHz, DMSO-$d_6$, δ, ppm): 28.61, 36.24, 44.21, 79.29, 118.79, 129.37, 135.41, 138.13, 153.03, 162.77; HRMS-EI (m/z): $[M+Na]^+$ calculated for $C_{23}H_{30}N_2O_4$: 421.2098, found: 421.3108.

Pyrenemethanol-blocked MDI (2i): Yield 95%; $^1$H NMR (500 MHz, DMSO-$d_6$, δ, ppm): 3.79 (s, 2H), 5.89 (s, 4H), 7.10-7.11 (d, 4H), 7.40-7.41 (d, 4H), 8.09-8.19 (m, 2H), 8.19-8.28 (m, 6H), 8.28-8.31 (m, 8H), 8.31-8.40 (m, 2H), 9.73 (br, 2H); $^{13}$C NMR (125 MHz, DMSO-$d_6$, δ, ppm): 57.51, 64.54, 118.87, 123.63, 124.24, 125.18, 125.98, 126.04, 126.85, 127.79, 128.49, 129.38, 130.68, 131.47, 136.10, 137.47, 153.96. HRMS-EI (m/z): [M+Na]$^+$ calculated for $C_{49}H_{34}N_2O_4$: 737.2411, found: 737.4223.

Triethylene glycol blocked MDI polymer (2j): $^1$H NMR (500 MHz, DMSO-$d_6$, δ, ppm): 3.56 (d, 4H), 3.64 (s, 4H), 3.78 (s, 2H), 4.18 (s, 4H), 7.09 (d, 4H), 7.37 (d, 4H), 9.64 (br, 2H); $^{13}$C NMR (125 MHz, DMSO-$d_6$, δ, ppm): 49.09, 60.72, 63.90, 69.21, 70.24, 70.27, 72.86, 118.84, 129.31, 135.98, 137.53, 153.96.

Oxime blocked MDI (2k): $^1$H NMR (500 MHz, DMSO-$d_6$, δ, ppm): 1.35-1.39 (t, 6H), 2.89 (s, 6H), 3.13 (s, 4H), 3.83 (s, 2H), 4.09-4.13 (q, 4H), 7.07-7.09 (d, 4H), 7.35-7.37 (d, 4H), 9.49 (br, 2H). $^{13}$C NMR (125 MHz, DMSO-$d_6$, δ, ppm): 14.68, 19.63, 34.08, 42.42, 61.12, 116.61, 128.05, 135.53, 138.17, 152.60, 154.16, 168.64. HRMS-EI (m/z): [M+Na]$^+$ calculated for $C_{27}H_{32}N_4O_8$: 563.2112, found: 563.2256.

General Procedure for deblocking of blocked isocyanates with TG. Blocked isocyanates (1.0 equiv.) were dissolved in anhydrous DMF and to this solution 5 mol % of n-Bu$_4$NF or CsF was added and the mixture was stirred at room temperature for 5 min. To the above reaction mixture, TG (2.0 equiv.) was added and the reaction was stirred under vacuum (500 mbar). After continued stirring for 1 hour, the reaction mixture was concentrated to dryness under vacuum to yield an orange solid. The orange solid was washed with dichloromethane to remove pyrenemethanol or other blocking agents and then dried under vacuum to afford TG-blocked TDI (3a) or fluorescein-blocked MDI (3b) in 75-80% yield.

TG-blocked TDI (3a): $^1$H NMR (500 MHz, DMSO-$d_6$, δ, ppm): 2.14 (s, 3H), 3.79 (s, 6H), 6.44 (s, 2H), 6.64-6.66 (d, 2H), 6.77-6.79 (d, 2H), 7.21-7.31 (m, 3H), 7.65-7.67 (m, 6H), 7.77-7.80 (m, 8H), 9.10 (br, 1H), 9.62 (br, 1H). $^{13}$C NMR (125 MHz, DMSO-$d_6$, δ, ppm): 31.21, 52.30, 87.95, 89.45, 94.93, 102.75, 109.97, 113.77, 118.93, 124.86, 125.39, 127.65, 129.39, 129.48, 129.62, 130.34, 135.49, 136.26, 137.19, 151.67, 152.37, 152.74, 153.09, 155.84, 156.02, 161.54, 162.76, 172.18. HRMS-EI (m/z): [M−Na]$^+$ calculated for $C_{49}H_{34}N_2O_{10}$: 833.2106, found: 833.2321.

Fluorescein-blocked MDI (3b): $^1$H NMR (500 MHz, DMSO-$d_6$, δ, ppm): 3.73 (s, 6H), 3.96 (s, 1H), 6.22 (s, 2H), 6.44-6.45 (d, 2H), 6.56-6.57 (d, 2H), 7.30-7.32 (d, 2H), 7.42-7.44 (d, 2H), 7.64-7.67 (m, 6H), 7.96-7.99 (m, 8H), 9.47 (br, 1H). $^{13}$C NMR (125 MHz, DMSO-$d_6$, δ, ppm): 52.30, 57.99, 87.94, 89.45, 102.75, 109.97, 113.77, 118.93, 124.86, 125.39, 127.65, 129.39, 129.48, 129.62, 130.34, 135.49, 136.26, 137.19, 147.33, 151.61, 152.74, 153.09, 156.06, 161.51, 161.54, 161.56, 162.75, 172.16. HRMS-EI (m/z): [M−Na]$^+$ calculated for $C_{55}H_{38}N_2O_{10}$: 909.2419, found: 909.2338.

General Procedure for deblocking of blocked isocyanates with triethylene glycol. Blocked isocyanates (1.05 equiv.) was dissolved in anhydrous DMF and to this solution 5 mol % of n-Bu$_4$NF or CsF was added and reaction was stirred at room temperature for 5 minutes. To the above reaction mixture, triethylene glycol (1.0 equiv.) was added and the reaction was stirred at 50° C. under vacuum (500 mbar). After continued stirring for 6 hours, polymerizations were terminated by adding methanol, and the polymer products were purified by repeated precipitation into acetone/methanol mixture, then dried under vacuum to afford the desired products in yields of 60-75% as white solids. Molecular weight estimation of polymers was performed by gel permeation chromatography (GPC) eluting in DMF. $^1$H NMR (500 MHz, DMSO-$d_6$, δ, ppm): 2.09 (s, 3H), 3.57 (s, 4H), 3.64 (s, 4H), 4.18 (s, 4H), 7.05-7.17 (dd, 2H), 7.51 (s, 1H), 8.90 (br, 1H), 9.65 (br, 1H). $^{13}$C NMR (125 MHz, DMSO-$d_6$, δ, ppm): 31.14, 52.08, 60.69, 63.90, 64.04, 69.20, 70.19, 72.84, 115.52, 123.70, 126.30, 130.68, 136.86, 137.48, 137.60, 153.89, 154.74, 162.78.

General Procedure for deblocking of blocked isocyanates and polymerization with 1,1,1-tris(hydroxymethyl)ethane. Blocked isocyanates (3.0 mmol) were dissolved in anhydrous DMF and to this solution was added 5 mol % of n-Bu$_4$NF or CsF. The resultant mixture was stirred at room temperature for 5 minutes. To the above reaction mixture, 1,1,1-tris(hydroxymethyl)ethane (2.0 mmol) was added and the reaction continued stirring at 50° C. under vacuum (500 mbar) for 5 hours. The resulting cross-linked products were washed with $CH_2Cl_2$ and dried under vacuum to afford cross-linked polyurethane in yields of 75-85%.

Exchange of oxime-TDI with 4-Methylumbelliferone. To solutions of the oxime-blocked TDI (1.0 equiv.) in anhydrous DMF was added 5 mole % of n-Bu$_4$NF or CsF, and the resulting mixture was stirred at room temperature for 10 minutes. Then, 4-methylumbelliferone (2.0 equiv.) was added and the mixture was stirred for 5 h. Water was added, and the product was recovered as a white solid, which was washed with chloroform to remove trace amounts of 3-methylisoxazol-5-one. The synthesized product was purified by passing through a plug of silica gel, filtering to remove trace urea, and drying under high vacuum to yield coumarin-blocked TDI in 86% yield. $^1$H NMR (500 MHz, DMSO-$d_6$, δ, ppm): 2.24 (s, 3H), 2.36 (s, 6H), 6.38 (s, 2H), 7.14 (s, 2H), 7.25-7.28 (m, 3H), 7.58 (d, 2H), 7.94 (d, 2H), 9.07 (br, 1H), 9.70 (br, 1H). $^{13}$C NMR (125 MHz, DMSO-$d_6$, δ, ppm): 31.22, 36.24, 102.64, 110.46, 110.72, 113.32, 117.53, 118.90, 126.70, 127.07, 153.45, 153.99, 154.06, 155.31, 160.18, 160.75, 161.63, 162.78. HRMS-EI (m/z): [M+Na]$^+$ calculated for $C_{29}H_{22}N_2O_8$: 549.1268, found: 549.2366.

The invention includes at least the following embodiments, which are non-limiting.

Embodiment 1

A method for deblocking a blocked isocyanate, the method comprising: contacting a blocked isocyanate, and a halide ion source, under conditions effective to provide a deblocked isocyanate.

Embodiment 2

The method of embodiment 1, wherein the blocked isocyanate is of formula (I) or (II)

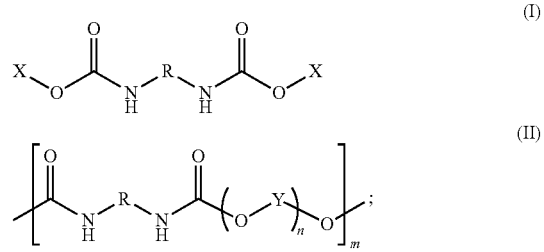

wherein R is independently at each occurrence a substituted or unsubstituted $C_{1-18}$ alkylene group or a substituted or unsubstituted $C_{6-20}$ arylene group; X is independently at each occurrence a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group; Y is a substituted or unsubstituted $C_{1-18}$ alkylene group or a substituted or unsubstituted $C_{6-20}$ arylene group; n is 1 to 100; and m is 1 to 100.

Embodiment 3

The method of embodiments 1 or 2, wherein the blocked isocyanate is derived from an isocyanate compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof.

Embodiment 4

The method of embodiment 2, wherein the blocked isocyanate is of formula (I) and X is independently at each occurrence a sec-propyl group, a tert-butyl group, a propargyl group, or a methyl pyrene group.

Embodiment 5

The method of embodiment 2, wherein the blocked isocyanate is of formula (II) and Y is ethylene and n is 3.

Embodiment 6

The method of any one of embodiments 1 to 5, wherein the halide ion source is a fluoride ion source, a chloride ion source, a bromide ion source, an iodide ion source, or a combination thereof.

Embodiment 7

The method of any one of embodiments 1 to 6, wherein the halide ion source comprises a fluoride ion source, preferably wherein the fluoride ion source comprises a tetra($C_{1-6}$alkyl)ammonium fluoride, potassium fluoride, sodium fluoride, cesium fluoride, lithium fluoride, lithium tetrafluoroborate, hydrogen fluoride, hydrogen fluoride pyridine, or a combination thereof.

Embodiment 8

The method of any one of embodiments 1 to 7, wherein the halide ion source is present in an amount of 1 to 20 mole percent, based on total moles of the blocked isocyanate.

Embodiment 9

The method of any one of embodiments 1 to 8, wherein the contacting of the blocked isocyanate and the halide ion source is in the presence of a solvent, preferably wherein the solvent comprises dimethylformamide, dimethylsulfoxide, n-methyl-2-pyrrolidone, dioxane, tetrahydrofuran, or a combination thereof.

Embodiment 10

The method of any one of embodiments 1 to 9, wherein the contacting is at a temperature of less than 100° C.

Embodiment 11

The method of any one of embodiments 1 to 10, wherein the contacting is for a time of 15 minutes to 10 hours.

Embodiment 12

The method of embodiment 1, comprising contacting a blocked isocyanate derived from an isocyanate compound comprising 2,4-toluene diisocyanate, 2,6-toluene diisocyanate, or a combination thereof; and a fluoride ion source comprising tetra-n-butylammonium fluoride, cesium fluoride, or a combination thereof, wherein the fluoride ion source is present in an amount of 3 to 7 mole percent, based on the total moles of the blocked isocyanate; in the presence of a solvent, at a temperature of 10 to 50° C., and for a time of 15 minutes to 1 hour, to provide the corresponding deblocked isocyanate.

Embodiment 13

A method of making a polyurethane, the method comprising: combining a blocked isocyanate comprising at least two blocked isocyanate groups; a polyol; and a halide ion source; in the presence of a solvent and under conditions effective to provide the polyurethane.

Embodiment 14

The method of embodiment 13, wherein the blocked isocyanate is derived from an isocyanate compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha', alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof.

Embodiment 15

The method of embodiment 13, wherein the blocked isocyanate comprises a blocked isocyanate prepolymer comprising repeating units according to formula (IV), wherein R is independently at each occurrence a substituted or unsubstituted $C_{1-18}$ alkylene group or a substituted or unsubstituted $C_{6-20}$ arylene group; Y is independent at each occurrence a substituted or unsubstituted $C_{1-18}$ alkylene group or a substituted or unsubstituted $C_{6-20}$ arylene group; and n is 1 to 100; and at least two blocked isocyanate end groups of formula (III) wherein X is a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group.

Embodiment 16

The method of any one of embodiments 13 to 15, wherein the halide ion source is a fluoride ion source, a chloride ion source, a bromide ion source, an iodide ion source, or a combination thereof.

Embodiment 17

The method of any one of embodiments 13 to 16, wherein the halide ion source comprises a fluoride ion source, preferably wherein the fluoride ion source comprises tetra($C_{1-6}$alkyl)ammonium fluoride, potassium fluoride, sodium fluoride, cesium fluoride, lithium fluoride, lithium tetrafluoroborate, hydrogen fluoride, hydrogen fluoride pyridine, or a combination thereof.

Embodiment 18

The method of any one of embodiments 13 to 17, wherein the polyol comprises an oligo($C_{1-6}$alkylene) glycol, tris(hydroxymethyl)ethane, or a combination thereof.

Embodiment 19

The method of any one of embodiments 13 to 18 wherein the combining is at a temperature of 30 to 70° C. and for a time of 1 to 10 hours.

Embodiment 20

The method of any one of embodiments 13 to 19, wherein the blocked isocyanate and the polyol are present in a molar ratio of 0.9:1 to 1.1:1.

Embodiment 21

The method of any one of embodiments 13 to 20, wherein the polyurethane has a number average molecular weight of 1,000 to 100,000 grams per mole.

Embodiment 22

A polyurethane foam comprising a polyurethane made by the method of any one of embodiments 13-21.

Embodiment 23

A method of making a polyurethane foam, the method comprising: combining a blocked isocyanate prepolymer and a halide ion source; in the presence of a solvent and under conditions effective to provide a deblocked polyurethane; and adding a diol in the presence of a foaming agent to provide the polyurethane foam.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety, including priority application U.S. 62/552,687, filed Aug. 31, 2017. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method for deblocking a blocked isocyanate, the method comprising:
   contacting
     a blocked isocyanate, and
     a halide ion source,
   at a temperature of less than 100° C. to provide a deblocked isocyanate;
   wherein the halide ion source is present in an amount of 1 to 20 mole percent, based on total moles of the blocked isocyanate.

2. The method of claim 1, wherein the blocked isocyanate is of formula (I) or (II)

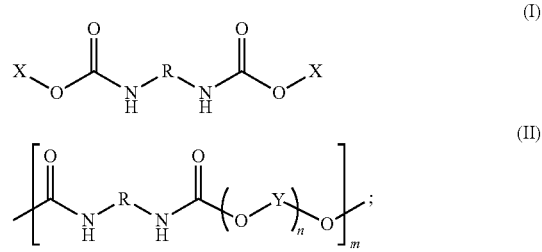

wherein
R is independently at each occurrence a substituted or unsubstituted $C_{1-18}$ alkylene group or a substituted or unsubstituted $C_{6-20}$ arylene group;
X is independently at each occurrence a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group;
Y is a substituted or unsubstituted $C_{1-18}$ alkylene group or a substituted or unsubstituted $C_{6-20}$ arylene group;
n is 1 to 100; and
m is 1 to 100.

3. The method of claim 1, wherein the blocked isocyanate is derived from an isocyanate compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof.

4. The method of claim 2, wherein the blocked isocyanate is of formula (I) and X is independently at each occurrence a sec-propyl group, a tert-butyl group, a propargyl group, or a methyl pyrene group.

5. The method of claim 2, wherein the blocked isocyanate is of formula (II) and Y is ethylene and n is 3.

6. The method of claim 1, wherein the halide ion source is a fluoride ion source, a chloride ion source, a bromide ion source, an iodide ion source, or a combination thereof.

7. The method of claim 1, wherein the halide ion source comprises a fluoride ion source.

8. The method of claim 1, wherein the halide ion source is present in an amount of 1 to 10 mole percent, based on total moles of the blocked isocyanate.

9. The method of claim 1, wherein the contacting of the blocked isocyanate and the halide ion source is in the presence of a solvent.

10. The method of claim 1, wherein the contacting is at a temperature of 10 to 50° C. or for a time of 15 minutes to 10 hours.

11. The method of claim 1, comprising
contacting
a blocked isocyanate derived from an isocyanate compound comprising 2,4-toluene diisocyanate, 2,6-toluene diisocyanate, or a combination thereof; and
a fluoride ion source comprising tetra-n-butylammonium fluoride, cesium fluoride, or a combination thereof, wherein the fluoride ion source is present in an amount of 3 to 7 mole percent, based on the total moles of the blocked isocyanate;

in the presence of a solvent, at a temperature of 10 to 50° C., and for a time of 15 minutes to 1 hour, to provide the corresponding deblocked isocyanate.

12. A method of making a polyurethane, the method comprising:
combining
a blocked isocyanate comprising at least two blocked isocyanate groups;
a polyol; and
a halide ion source;
in the presence of a solvent at a temperature of 30 to 70° C. and for a time of 1 to 10 hours to provide the polyurethane;
wherein the halide ion source is present in an amount of 1 to 20 mole percent, based on total moles of the blocked isocyanate.

13. The method of claim 12, wherein the blocked isocyanate is derived from an isocyanate compound comprising 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, or a combination thereof.

14. The method of claim 12, wherein the blocked isocyanate comprises a blocked isocyanate prepolymer comprising repeating units according to formula (IV)

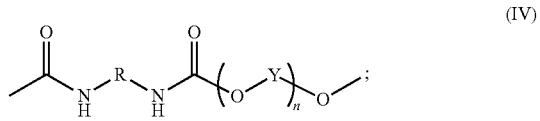

(IV)

wherein
R is independently at each occurrence a substituted or unsubstituted $C_{1-18}$ alkylene group or a substituted or unsubstituted $C_{6-20}$ arylene group;
Y is independent at each occurrence a substituted or unsubstituted $C_{1-18}$ alkylene group or a substituted or unsubstituted $C_{6-20}$ arylene group; and
n is 1 to 100; and
at least two blocked isocyanate end groups of formula (III)

(III)

wherein X is a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group.

15. The method of claim 12, wherein the halide ion source is a fluoride ion source, a chloride ion source, a bromide ion source, an iodide ion source, or a combination thereof.

16. The method of claim 12, wherein the polyol comprises an oligo($C_{1-6}$alkylene) glycol, tris(hydroxymethyl)ethane, or a combination thereof.

17. The method of claim 12, wherein the combining is at a temperature of 40 to 60° C. and for a time of 1 to 8 hours.

18. The method of claim 12, wherein the blocked isocyanate and the polyol are present in a molar ratio of 0.9:1 to 1.1:1.

19. The method of claim 1, comprising
    contacting
        the blocked isocyanate; and
        a fluoride ion source, wherein the fluoride ion source is present in an amount of 1 to 10 mole percent, based on the total moles of the blocked isocyanate;

in the presence of a solvent, at a temperature of 10 to 50° C., to provide the corresponding deblocked isocyanate.

20. The method of claim 19, wherein the blocked isocyanate is of Formula (I)

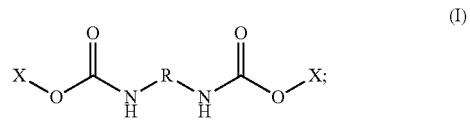

wherein
    R is independently at each occurrence a substituted or unsubstituted $C_{1-18}$ alkylene group or a substituted or unsubstituted $C_{6-20}$ arylene group; and
    X is independently at each occurrence a substituted or unsubstituted $C_{1-12}$ alkyl group, a substituted or unsubstituted $C_{2-12}$ alkenyl group, a substituted or unsubstituted $C_{2-12}$ alkynyl group, a substituted or unsubstituted $C_{1-12}$ alkoxy group, or a substituted or unsubstituted $C_{6-24}$ aryl group.

* * * * *